US007344615B2

(12) United States Patent
Sato et al.

(10) Patent No.: US 7,344,615 B2
(45) Date of Patent: Mar. 18, 2008

(54) METHOD AND APPARATUS FOR PERFORMING A CHARGING PROCESS ON AN IMAGE CARRYING DEVICE

(75) Inventors: Masumi Sato, Kanagawa-ken (JP); Hiroshi Yoshinaga, Chiba-ken (JP); Yukiko Iwasaki, Kanagawa-ken (JP); Hitoshi Ishibashi, Tokyo (JP); Takatsugu Fujishiro, Tokyo (JP); Masami Hiramatsu, Kanagawa-ken (JP); Hiroko Hirano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 312 days.

(21) Appl. No.: 11/250,485

(22) Filed: Oct. 17, 2005

(65) Prior Publication Data

US 2006/0032581 A1 Feb. 16, 2006

Related U.S. Application Data

(62) Division of application No. 10/315,111, filed on Dec. 10, 2002, now Pat. No. 6,977,022, which is a division of application No. 09/778,738, filed on Feb. 8, 2001, now Pat. No. 6,546,219.

(30) Foreign Application Priority Data

Feb. 8, 2000 (JP) ........................... P2000-030908
Jan. 31, 2001 (JP) ............................ P2001-24007

(51) Int. Cl.
*B29C 63/10* (2006.01)

(52) U.S. Cl. ...................... 156/187; 156/184; 156/188; 399/176

(58) Field of Classification Search ................ 156/187, 156/184, 188, 190; 399/176
See application file for complete search history.

(56) References Cited

U.S. PATENT DOCUMENTS

| | | | |
|---|---|---|---|
| 3,812,780 | A | 5/1974 | Borelli |
| 3,944,354 | A | 3/1976 | Benwood et al. |
| 4,033,768 | A | 7/1977 | Wieloch |
| 5,146,280 | A | 9/1992 | Kisu |

(Continued)

FOREIGN PATENT DOCUMENTS

| | | |
|---|---|---|
| JP | 2-304583 | 12/1990 |

(Continued)

OTHER PUBLICATIONS

U.S. Appl. No. 11/774,268, filed Jul. 6, 2007, Satoh et al.

*Primary Examiner*—Jeff H. Aftergut
*Assistant Examiner*—Daniel McNally
(74) *Attorney, Agent, or Firm*—Oblon, Spivak, McClelland, Maier & Neustadt, P.C.

(57) ABSTRACT

A charge roller that includes a metal core, an elastic member configured wrapped around the metal core, and film members is disclosed. Each of the film members is wrapped around each end of the elastic member in a circumferential direction of the metal core such that at least a part of each of the film members exists at every position around the ends of the elastic member in an axial direction of the metal core. Portions of the film members do not overlap each other in an radial direction of the metal core.

6 Claims, 19 Drawing Sheets

U.S. PATENT DOCUMENTS

| | | | |
|---|---|---|---|
| 5,319,337 | A | 6/1994 | Matsunari et al. |
| 5,339,141 | A | 8/1994 | Suzuki et al. |
| 5,424,814 | A | 6/1995 | Suzuki et al. |
| 5,430,527 | A | 7/1995 | Maruyama et al. |
| 5,440,373 | A | 8/1995 | Deki et al. |
| 5,446,615 | A | 8/1995 | Matsumoto et al. |
| 5,512,984 | A | 4/1996 | Kimura et al. |
| 5,515,145 | A | 5/1996 | Sasaki et al. |
| 5,537,197 | A | 7/1996 | Fujishiro et al. |
| 5,565,973 | A | 10/1996 | Fujishiro et al. |
| 5,576,805 | A | 11/1996 | Ishihara et al. |
| 5,583,630 | A | 12/1996 | Kimura et al. |
| 5,655,193 | A | 8/1997 | Fujishiro et al. |
| 5,659,853 | A | 8/1997 | Matsuda et al. |
| 5,671,465 | A | 9/1997 | Kimura et al. |
| 5,766,753 | A | 6/1998 | Murata et al. |
| 5,799,229 | A | 8/1998 | Yokoyama et al. |
| 5,946,529 | A | 8/1999 | Sato et al. |
| 5,953,568 | A | 9/1999 | Fujishiro et al. |
| 5,993,912 | A | 11/1999 | Yoo |
| 6,001,454 | A | 12/1999 | Murata et al. |
| 6,006,050 | A | 12/1999 | Watanabe |
| 6,014,532 | A | 1/2000 | Takeichi et al. |
| 6,055,388 | A | 4/2000 | Watanabe et al. |
| 6,055,394 | A | 4/2000 | Suda et al. |
| 6,070,030 | A | 5/2000 | Fujishiro |
| 6,088,551 | A | 7/2000 | Sato et al. |
| 6,101,351 | A | 8/2000 | Suda et al. |
| 6,118,964 | A | 9/2000 | Kojima et al. |
| 6,134,408 | A | 10/2000 | Kataoka et al. |
| 6,141,516 | A | 10/2000 | Law et al. |
| 6,208,826 | B1 | 3/2001 | Yoshinaga et al. |
| 6,219,520 | B1 | 4/2001 | Ehara |
| 6,256,465 | B1 | 7/2001 | Yoshinaga et al. |
| 6,295,438 | B1 | 9/2001 | Fujishiro et al. |
| 6,334,039 | B1 | 12/2001 | Yoshinaga et al. |
| 6,336,013 | B1 | 1/2002 | Suda et al. |
| 6,366,754 | B1 | 4/2002 | Sato et al. |
| 2004/0031556 | A1 | 2/2004 | Kaneko et al. |
| 2006/0032581 | A1 | 2/2006 | Sato et al. |

FOREIGN PATENT DOCUMENTS

| | | | |
|---|---|---|---|
| JP | 03240076 | A | 10/1991 |
| JP | 4-246666 | | 9/1992 |
| JP | 04360167 | A | 12/1992 |
| JP | 05107871 | A | 4/1993 |
| JP | 5-273837 | | 10/1993 |
| JP | 6-202433 | | 7/1994 |
| JP | 6-269754 | | 9/1994 |
| JP | 7-121002 | | 5/1995 |
| JP | 7-199652 | | 8/1995 |
| JP | 7-209959 | | 8/1995 |
| JP | 9-179444 | | 7/1997 |

METHOD AND APPARATUS FOR PERFORMING A CHARGING PROCESS ON AN IMAGE CARRYING DEVICE

CROSS-REFERENCES TO RELATED APPLICATIONS

This application is a divisional of U.S. patent application Ser. No. 10/315,111, filed Dec. 10, 2002, now U.S. Pat. No. 6,977,022, which is a divisional of U.S. patent application Ser. No. 09/778,738, filed Feb. 8, 2001, now U.S. Pat. No. 6,546,219 B2, issued Apr. 8, 2003, and claims priority to Japanese patent application Nos. JPAP2000-030908~filed Feb. 8, 2000, and JPAP2001-24007, filed Jan. 31, 2001. The contents of these applications are incorporated herein by reference.

BACKGROUND OF THE INVENTION

1. Field of the Invention

The present invention relates to a method and apparatus for roller charging, and more particularly to a method and apparatus for performing a charging process relative to an image carrying member in an electrophotographic image forming process.

2. Discussion of the Background

Conventionally, electrophotographic image forming apparatuses such as copying machines, printers, facsimile machines, and so on use a variety of ways for evenly applying a charge to a photoconductive member before generating an electrostatic latent image.

In one exemplary way, a corona discharge is used. A corona charge apparatus includes a charge wire made of tungsten or nickel and which is extended in a metal mesh casing. The charge wire is arranged at a position close to a photoconductive member, and a voltage of a direct current or a direct current overlaid with an alternating current is applied between the charge wire and the photoconductive member so as to produce a corona discharge therebetween. Thereby, the surface of the photoconductive member is charged.

The above corona charge apparatus, however, has a drawback in that various discharge products such as ozone, NOx, etc. are produced due to the relatively high voltage applied. This results in environmental pollution and also causes problems with the image forming process in that the discharge products often produce a coat of nitric acid or nitrate which adversely affects formation of the image.

Therefore, a contact type charge apparatus that produces less ozone and consumes less electricity has been used in place of the corona charge apparatus. Such contact type charge apparatus includes a charge member with a conductive material formed in a roller, a brush, or an elastic blade and which contacts a surface of an image carrying member such as a photoconductive member. The surface of the image carrying member is charged by an application of a voltage between the charge member and the image carrying member.

The roller charge member, for example, includes a metal core and an elastic layer (e.g., conductive rubber) covering the surface of the metal core. When such an elastic layer is left in contact under pressure with the surface of the image carrying member for a relatively long time period, an inclusion such as plastic included in the elastic layer may be extruded to the surface and will be deposited on the surface of the image carrying member. This results in a dirty mark on an image.

Further, in the contact type charge apparatus, the charge process is performed under the condition that the charge member contacts the surface of the image carrying member. Therefore, the charge member may receive the residual toner left on the surface of the image carrying member after an image transfer process. This causes a deterioration of charging performance.

As an attempt to solve the above problems, a roller of the charge roller included in the charge member is provided with spacers, tapes, or films on both ends thereof so that the both ends evenly have a slightly greater diameter. With this charge roller, the surface of the photoconductive member is held distant from the charge roller except for the ends thereof. Thereby, another non-contact type charge apparatus is made. Related techniques for this non-contact type charge apparatus are described in published Japanese unexamined patent application, Nos. 3-240076, No. 4-360167, No. 5-107871, for example.

Further, published Japanese unexamined patent application No. 7-121002, describes an image forming apparatus in which a photoconductive drum is wrapped at both ends with sheet members. A charged plate for applying a charge to the photoconductive drum contacts the sheet members fixed on the ends of the photoconductive drum, thereby charging the photoconductive drum. With such a configuration, an image forming surface of the photoconductive drum preserved between the two sheet members is held apart from the charged plate, while the surface is charged. This is referred to as a non-contact type charging.

With the above non-contact type charge apparatus, portions of the charge roller corresponding to an image forming region do not contact the surface of the photoconductive member. Therefore, it eliminates the drawbacks of the contact type charge apparatus such as the deposition of the material included in the elastic member on the photoconductive member and the transfer of the residual toner deposited on the photoconductive member to the charge member.

However, it is difficult to evenly increase diameters of both ends of the charge roller which is covered by the elastic member, by wrapping a film, for example, around the ends of the wrapping elastic member. This is because the film is needed to perfectly wrap each end surface of the elastic member without a slight gap, and therefore the variations of the film in length are needed to be avoided.

FIG. 31 shows the above-described charge roller in which each film 60 is short in a circumferential direction of the charge roller such that a space S is formed between edges of each film 60 facing each other after a turn. With the charge roller of FIG. 31, as illustrated in FIG. 32, a gap G held between the surfaces of the film 60 and a photoconductive member 4 loses a distance of $\delta$ in the above space S. That is, the gap G is not held constant during a turn of the charge roller.

In the above charge roller, the gap G is typically decreased around the center of the charge roller in its axial direction. This is caused due a deformation of the elastic member around the both ends thereof and so on. Therefore, when using a relatively thin film, the charge roller which is the non-contact type charge roller has a risk at the center portion thereof to contact the surface of the photoconductive member.

Accordingly, the film must be thick enough to avoid the above problem. However, an increase in film thickness will make the gap G greater, in particular, around the positions close to the films, resulting in abnormal discharge. This causes a dirty white mark on an image. In other words, operation of the charge roller is very sensitive to the thickness of the film.

Generally, in the non-contact type charging apparatus, somewhat constant charge voltage can be obtained under the condition that the gap is varied when the charge roller is applied with only the direct current voltage and when the gap between the surfaces of the charge roller and the photoconductive member (e.g., the image carrying member) is smaller than a predetermined value (i.e., 20 μm).

When the above gap is greater than the predetermined value, however, the charge voltage can no longer be constant and is decreased in accordance with the gap. To compensate such voltage reduction, a DC (direct current) voltage overlaid by an AC (alternating current) voltage is applied to the charge roller. Thereby, a constant charge voltage is produced.

In this case, abnormal discharge may occur when the voltage applied according to the gap is too large. The voltage to be applied is needed to be controlled at a level that does not cause an abnormal discharge. As a result, the gap needs to be smaller than a certain value at which abnormal discharge does not occur. In other words, the thickness of the film is also restricted from this aspect.

On the other hand, as illustrated in FIG. 33, the edges of the film 60 may be overlapped when the film has a length slightly longer than a length of a circumference of the elastic member 62. The overlapped portion has a thickness twice as great as the other portions of the film 60. Therefore, the gap between the surfaces of the charge roller and the photoconductive member is greater where the overlapped portions contact the photoconductive member in each turn of the charge roller. Thus, the above gap is changed in every turn of the charge roller either when the length of the film in the circumferential direction of the elastic member is made longer or shorter than the length of circumference of the elastic member.

Generally, the above-described photoconductive member (the image carrying member) includes a photoconductive drum having a drum shape. Accordingly, the film may be wrapped around both ends of the photoconductive drum in order to provide the gap between the surfaces of the charge roller and the photoconductive drum, as described above with reference to the published Japanese unexamined patent application No. 7-121002. In this case, the photoconductive drum is typically made of a hard material and therefore it will not be deformed when receiving pressure from the charge roller via the films. This in turn causes no deformation of the films.

However, in the case of the charge roller with wrapping films on its ends, the films are attached on the elastic member wrapped around the metal core. Accordingly, the elastic member is deformed by the pressure from the photoconductive member via the wrapped films and the films will accordingly be deformed. As a result, the films are easily peeled off. Therefore, in the charge roller with wrapping films, it is desirable to avoid an application of an intensive pressure to a specific portion of the elastic member so as not to cause a deformation and/or leaning toward that specific portion.

The above-described image forming apparatus described in the published Japanese unexamined patent application No. 7-121002, has a drawback. With this image forming apparatus, the film members are attached to the photoconductive drum side. In order to obtain a desired photocell charging performance, the distance of the image forming area between the film members needs to be longer. But, this makes it difficult to maintain the straightness of the relatively long surface of the photoconductive drum within a desired tolerance and therefore the manufacturing cost is increased. This drawback is further explained in detail in the following description.

In the above forming apparatus, a transfer process is achieved by contact between a transfer roller and the photoconductive drum. During this process, the transfer roller receives a higher pressure from the film members than other portions of the photoconductive drum. Thus, the transfer roller is prone to be worn at both ends and a leak of the charge at the ends thereof which are worn will occur. At the same time, the film members themselves will be worn and, as a result the gap for assuring the desirable charging performance cannot be formed.

Also, in the above forming apparatus, a cleaning process is achieved by contact between a cleaning member and the photoconductive drum. If the cleaning member has a length across both film members, the transfer roller receives a higher pressure from the film members than other portions of the photoconductive drum during the cleaning process. Therefore, the cleaning member is prone to wearing at both ends, causing leakage of the charge at the ends which are worn. At the same time, the film members themselves will also be worn and the charging process will also be degraded. That is, the cleaning member needs to have a length within a length between the both film members is arranged inside between the both film members.

The cleaning process is particularly needed in the non-contact type charging apparatus in which the charging member is arranged to face the photoconductive member with a relatively small gap because the residual toner can easily be transferred onto the charging member through this gap. If a cleaning member is not provided and the charging member is deposited with the residual toner, this causes a reduction of the charging performance and results in production of an abnormal image.

Therefore, to avoid the above problem, it is desirable to prevent the residual toner from flowing into the effective charging area by appropriately setting the effective cleaning width of the cleaning member. For this purpose, the effective cleaning width and the width of the effective charging area have the following relationship:

the effective cleaning width>the width of the effective charging area.

The width of the effective charging area in the image forming apparatus is normally determined in the manner described below. First, the maximum size of a recording sheet acceptable by the image forming apparatus determines the width. When the size is A3, the length of its short side, 297 mm, is the width, and when the size is A4, the length of its short side, 210 mm, is the width. Second, based on the consideration of rolling of the recording sheet during the time of sheet transferring, an exposure width with a margin is determined. This exposure width may be varied based on the consideration of variations of sheet transferring quality between the machines and is normally a width of the short side length of the maximum sheet size plus a margin of 2 mm to 4 mm to both sides, resulting a width of 301 mm to 305 mm. As a feedback control, when a sensor pattern for measuring an image density, for example, is written in a side area outside the maximum sheet width, the writing width is accordingly increased.

Third, development width is wider than the exposure width so as to be able to develop images written inside the exposure width. The development width is, for example, 304 mm to 313 mm in machines capable of handling A3-sized recording sheets. Lastly, the effective charging width is determined. The effective charging width is wider than the development width because the voltage of the background in the development area is charged to a predetermined voltage. For example, the effective charging width is 305 mm to 322 mm in machines capable of using A3-sized recording sheets. Thus, the effective charging width and the associated values are determined according to accuracy of elements and assembling of each machine.

Blade, brush, and magnetic brush methods are widely known for cleaning the surface of the photoconductive member. In these methods, the cleaning member contacts the surface of the photoconductive member so as to mechanically scrape the toner, or the cleaning member is applied with a voltage to clean off the toner by an electrostatic force.

Accordingly, those types of the cleaning member which contact the surface of the photoconductive member are needed to be extended inside the both film members so as not to contact the film members under a consideration of the aforementioned problems. Therefore, as shown in FIG. 34, the effective cleaning width of the cleaning member satisfies Wa>Wb>Wc, wherein Wa represents an inside distance between the two film members, Wb represents the effective cleaning width, and Wc represents the effective charging width.

In the non-contact type charging apparatus in which the charge member and the photoconductive member are arranged close to each other with a small gap, straightness of the charge member and the photoconductive member is important. For example, when a charge roller is not very straight and is curved, for example, the charge roller will turn in an eccentric manner and the distance of the gap between the charge roller and the photoconductive member will vary. In some cases, a part of the charge roller will touch the photoconductive member during one turn of the charge roller. This is same to the straightness of the photoconductive drum.

Therefore, both the charge member and the photoconductive drum are required to be very straight, particularly between outside edges of the film members. Accordingly, if the length of such a charge roller or photoconductive drum is made shorter, this would increase yields of such components and thereby reduce the cost of manufacturing.

Based on the above, it would be preferable that the two film members are arranged with the shorter distance to each other and, in the non-contact charging apparatus, the inside distance between the film members is preferably equal to the effective charging width.

However, this will cause a problem in some cases. For example, FIG. 35 shows a case where two film members 218 are wrapped around both ends of a photoconductive drum 205. As shown in FIG. 35, if the film members 218 arranged at the positions drawn in virtual lines and the effective charging width Wc is between the inside edges of the two film members 218, the cleaning member contacts the film members 218 since the effective cleaning width Wb must be wider than the effective charging width Wc.

Therefore, in this case, the film members 218 are preferably arranged at the positions drawn in solid lines in FIG. 35. As a result, the distance between the two film members 218 is made longer. Accordingly, a relatively large area of the photoconductive drum 205 is required to be extremely straight.

SUMMARY OF THE INVENTION

One aspect of the invention relates to a novel charge roller. In one example, a novel charge roller includes a metal core, an elastic member, and film members. The elastic member is wrapped around the metal core. Each of the film members is wrapped around each end of the elastic member wrapped around the metal core in a circumferential direction of the metal core such that at least a part of each of the film members exists at every position around each end of the elastic member in an axial direction of the metal core without the film members overlapping each other in an radial direction of the metal core.

Each of short side edges of each of the film members may have an edge line with an acute angle relative to an edge of a longitudinal side of the each of the film members to form an acute triangle such that the edge lines of the short side edges face each other to form a thin-line-shaped space therebetween. In one embodiment, the acute angle is approximately 45 degrees.

The present application also relates to a novel charging apparatus that includes the novel charge roller.

The present application also relates to a novel image carrying apparatus that incorporates the novel charge roller and to a novel electrophotographic image forming apparatus that includes the novel charge roller. In one example, the charge roller is arranged and configured to contact the image carrying member with the film members of the charge roller, and the image carrying member holds a charge on a surface thereof by an application of a voltage applied between the charge roller, and the image carrying member. Further, the image carrying member is exposed to light so that an electrostatic image is formed on the image carrying member.

The present invention also relates to a novel method of preparing a charge roller. In one embodiment, film wrapping apparatus in which a pair of rails mounted in parallel on a plane plate is arranged such that when an unfinished charge roller is placed on the pair of rails, both ends of an elastic member wrapped around a metal core of the unfinished charge roller are placed outside the pair of rails. Each of the pair of rails has a thickness approximately equal to a thickness of a film member. Two pieces of the film members are set in parallel to each other with their adhesive surfaces upwards on the plane plate respectively outside and in parallel to the pair of rails with a distance greater than a whole length of each of the two film members from each other in a longitudinal direction. An unfinished charge roller is placed on the pair of rails so that the both ends of the elastic member wrapped around the metal core of the unfinished charge roller are placed outside the pair of rails. The unfinished charge roller is moved by rotation along the pair of rails so that the film members are adhered with the adhesive surfaces to the ends of the elastic member wrapped around the metal core of the unfinished charge roller.

BRIEF DESCRIPTION OF THE DRAWINGS

A more complete appreciation of the present application and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
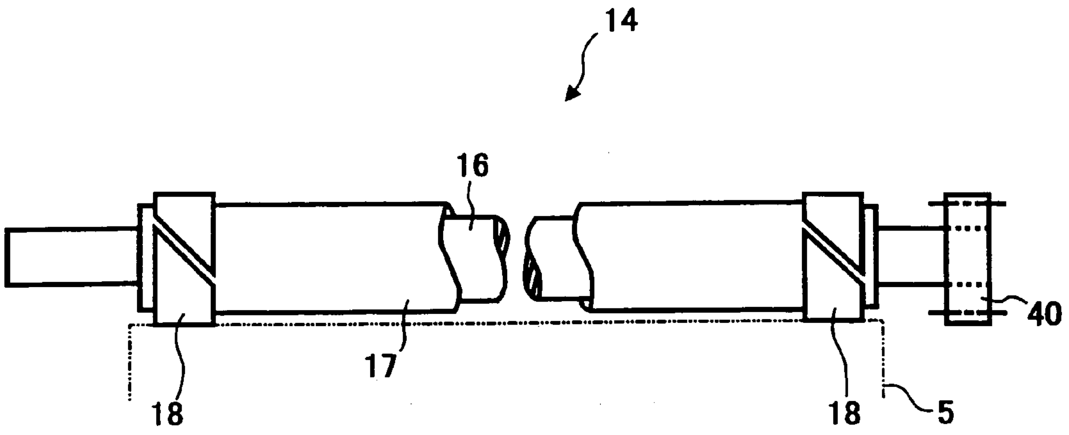
FIG. 1 is a schematic diagram of a charge roller according to an embodiment of the present invention.

In describing preferred embodiments illustrated in the drawings, specific terminology is employed for the sake of clarity. However, the invention is not intended to be limited to the specific terminology so selected and it is to be understood that each specific element includes all technical equivalents which operate in a similar manner.

Referring now to the drawings, wherein like reference numeral designate identical or corresponding parts throughout the several views, and more particularly to FIGS. 1-4, a charge roller 14 according to an embodiment of the present invention is described.

The charge roller 14 of FIG. 1, a charged roller, is arranged next to a photoconductive drum 5 which receives a charge from the charge roller 14 and is applied with a voltage by a power supply source. The photoconductive drum 5 is also referred to as an image carrying member. The charge roller 14 includes a nickel-plated metal core 16 and an elastic member 17 that covers the metal core 16. The elastic member 17 is made of a conductive material (i.e., an epichlorohydrin rubber) and has a volume intrinsic resistance in a range of $10^3$ to $10^8$ Ω cm.

Figure 2:
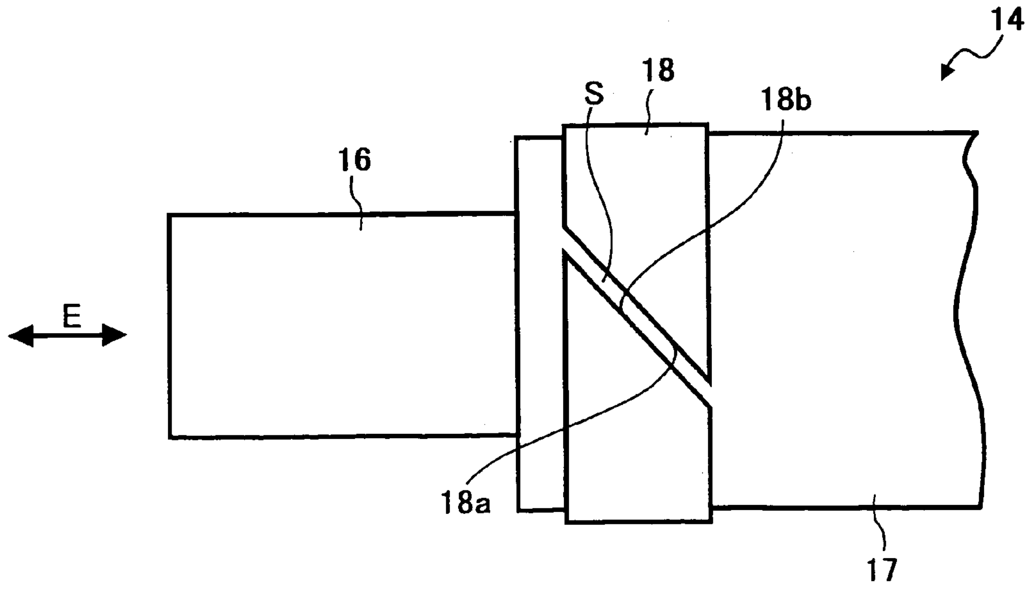
FIG. 2 is a schematic diagram showing an end side of the charge roller of FIG. 1, where a film strip is wrapped.
Figure 3:
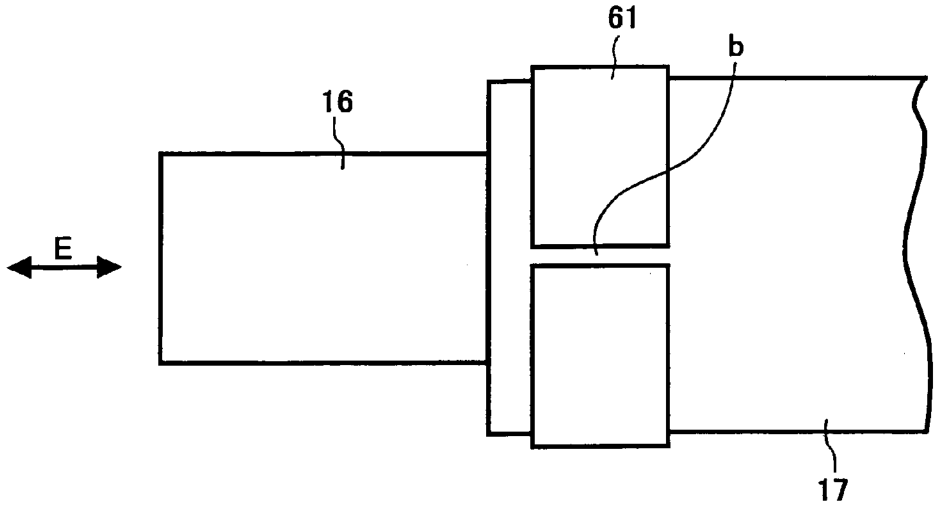
FIG. 3 is a schematic diagram showing the end side of the charge roller of FIG. 2, where a comparatively undesirable film strip is wrapped.

The charge roller 14 further includes film strips 18, each having an adhesive surface and which is made of polypropylene, polyester, or polyethylene terephthalate, for example. One film strip 18 is wrapped around one end of the elastic member 17 in its circumferential direction and the other film strip 18 is wrapped around the other end thereof, as shown in FIG. 1. More specifically, each film strip 18 is formed to have tilt edges 18*a* and 18*b* and is fixed by adhesion to the end side surface of the elastic member 17 such that the tilt edges 18*a* and 18*b* are not overlapped each other to form a space S therebetween and that there is no position in the circumferential direction around the elastic member 17 at which the film strip 18 does not exists in an axis direction indicated by an arrow E, as shown in FIG. 2. This is to avoid a case of a square-formed film strip 61 in which, as illustrated in FIG. 3, a horizontal space b is formed and there is a position in the circumferential direction around the elastic member 17 at which the film strip 61 does not exists in the axis direction indicated by the arrow E.

The above charge roller 14 is placed at such a position that the film strips 18 respectively contact the surface of the photoconductive drum 5, and a predetermined voltage is applied by the power supply source (not shown) between the charge roller 14 and the photoconductive drum 5. Thus, the charge roller 14 serves as a charging apparatus for charging the surface of the photoconductive drum 5.

Pressure springs 19 are provided to apply a predetermined pressure to the respective end sides of the metal core 16 of the charge roller 14 via sliding shaft supporters 30. The charge roller 14 is thereby held under pressure in contact with the photoconductive drum 5 via the film strips 18.

Figure 4:
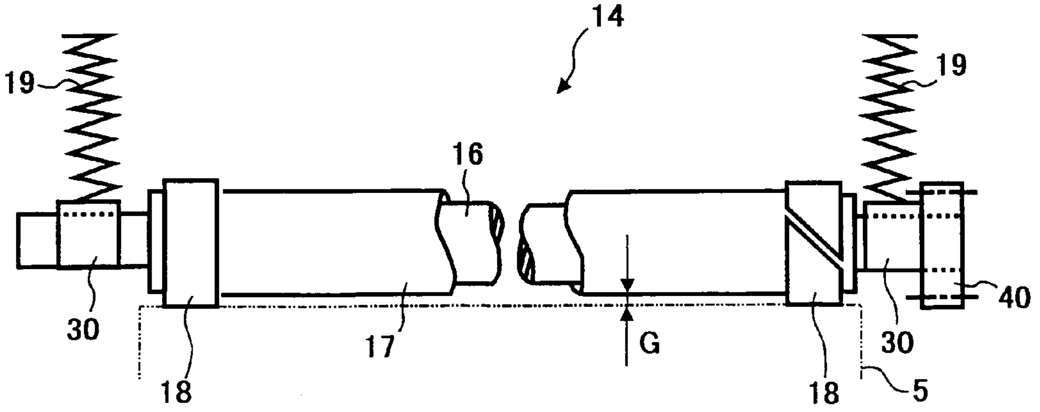
FIG. 4 is a schematic diagram showing the charge roller of FIG. 1 which contacts a photoconductive drum under pressure with pressure springs.

As an alternative to the pressure springs 19, the charge roller 14 may be held under pressure by its own weight in contact with the photoconductive drum 5 via the film strips 18. As shown in FIG. 4, the charge roller 14 is provided with a driving gear 40 which is fixed at one end of the metal core 16. The driving gear 40 is driven by a motor so that the charge roller 14 is rotated at the same linear velocity as that of the photoconductive drum 5. The voltage from the power supply source is applied to the metal core 16 of the charge roller 14. More specifically, a DC (direct current) voltage (i.e., −700 volts) is applied under a constant-voltage control and, at the same time, an AC (alternating current) voltage is applied under a constant-current control.

In the charge roller 14, the metal core 16 has a diameter of 9 mm and the rubber layer of the elastic member 17 made of the epichlorohydrin rubber has a diameter of 11.14 mm with a manufacturing tolerance of +0 mm and −0.2 mm, for example. Each of the file strips 18 wrapped around the end sides of the elastic member 17 has a length of 34 mm with a manufacturing tolerance of +0 mm and −1 mm, a width of 8 mm with a manufacturing tolerance of +0 mm and −1 mm, a width of 8 mm with a manufacturing tolerance of +0.5 mm and −0 mm, and a thickness of 60 μm, inclusive of an adhesive layer having a thickness of 20 μm, with a manufacturing tolerance of ±7.5 μm. The adhesive layer easily loses its thickness by an application of pressure and therefore the thickness of the film strip 1B will be 40 μm and ±5 μm from the tolerance. The elastic member 17 has a hardness of approximately 79 degrees according to the former JIS-A (Japanese Industrial Standards) and uses a rubber of which hardness is proven with a test piece having a hardness of 50 degrees or more according to the above former JIS-A.

Figure 5:
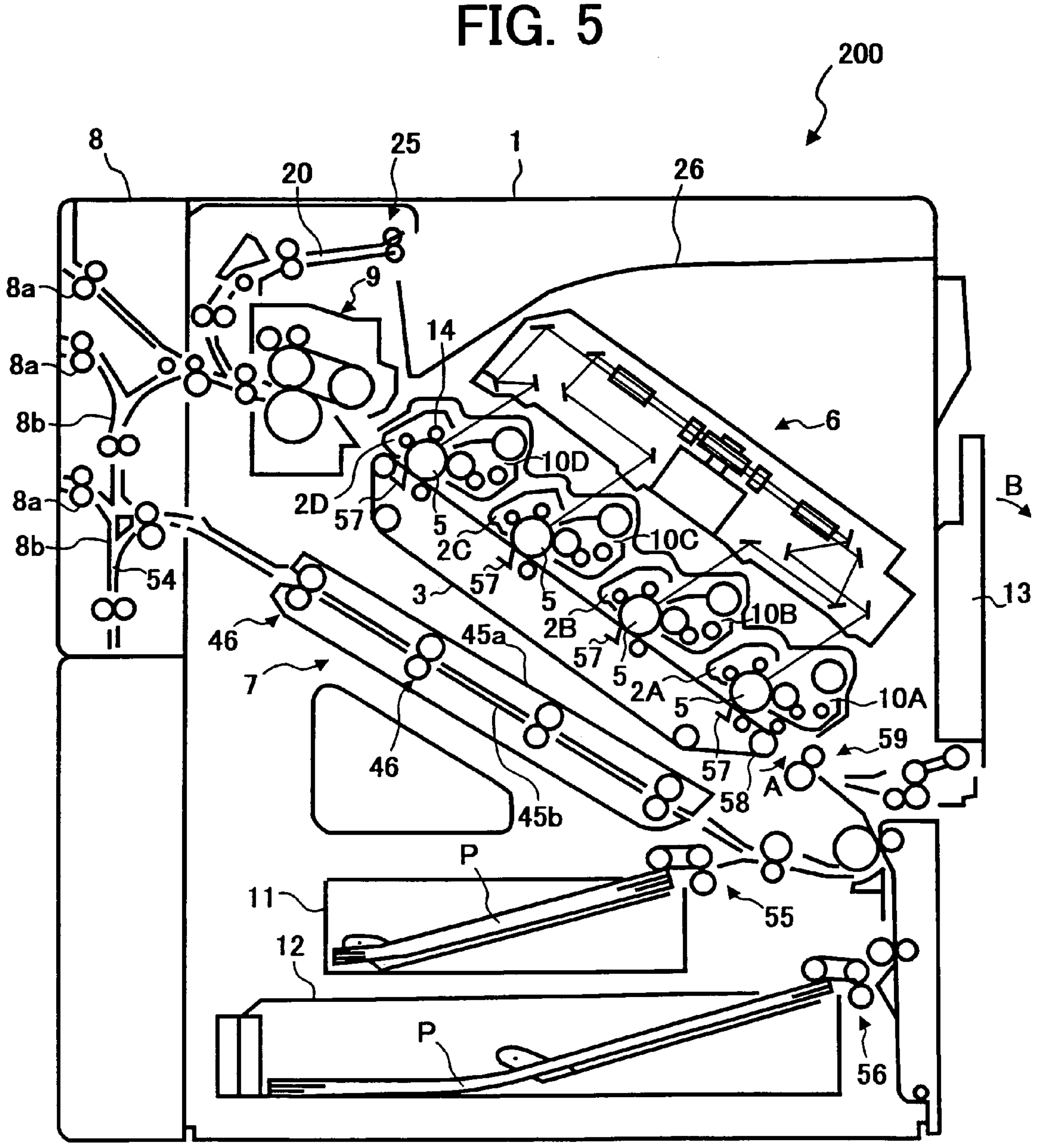
FIG. 5 is a schematic cross-sectional view of a full color compact printer including the charge roller of FIG. 1.

The charging apparatus having the thus-configured charge roller 14 can be installed in an image forming apparatus. FIG. 5 shows a compact full color printer 200, as one example of the image forming apparatus, in which such charging apparatus is installed.

The printer 200 of FIG. 5 is an electrophotographic full color printer and includes a main unit 1 and a sheet flipping unit 8. As shown in FIG. 5, the main unit 1 includes four photoconductive units 2*a*-2*d*, a transfer belt 3, an optical writing unit 6, a duplex unit 7, a sheet flipping unit 8, and a fixing unit 9. The main unit 1 further includes four development units 10*a*-10*d*, sheet cassettes 11 and 12, a manual insertion tray 13, a reverse path 20, a pair of ejection rollers 25, and a facedown tray 26.

The photoconductive units 2*a*-2*d* are detachably deposited at an approximate center of the main unit 1. Each of the photoconductive units 2*a*-2*d* includes the above-described photoconductive drum 5 to form and carry an image. Under the photoconductive units 2*a*-2*d*, the transfer belt 3 is extended between a plurality of rollers such that the photoconductive drums 5 contact the surface of the transfer belt 3. The transfer belt 3 is rotated in a direction A.

The development units 10*a*-10*d* are provided next to photoconductive units 10*a*-10*d*, respectively, and are configured to apply four different color toners. The optical writing unit 6 is arranged above the development units 10*a*-10*d* and the duplex unit 7 is arranged thereunder.

The sheet flipping unit 8 is provided at a rear side of the main unit 1. With the sheet flipping unit 8, a recording sheet P can be flipped before ejection or can be forwarded to the duplex unit 7.

The fixing unit 9 is provided between the transfer belt 3 and the sheet flipping unit 8. The fixing unit 9 fixes a toner image onto the recording sheet P. The reverse path 20 is provided downstream from the fixing unit 9 in a sheet flow direction. The recording sheet P can be ejected through the reverse path 20 to the facedown tray 26 with the pair of ejection rollers 25.

The sheet cassettes 11 and 12 are provided at a lower part thereof. The sheet cassette 11 may contain a plurality of the recording sheets P in one size and the sheet cassette 12 may contain a plurality of the recording sheets P in another size. The manual insertion tray 13 is provided at a front side of the main unit 1 and is turned in a direction B so as to form an opening for receiving the recording sheet P.

The photoconductive units 2*a*-2*d* have a common structure but form images corresponding to different color toners: yellow, magenta, cyan, and black, respectively. The photoconductive units 2*a*-2*d* are spaced uniformly in line in parallel to the sheet transfer direction.

Figure 6:
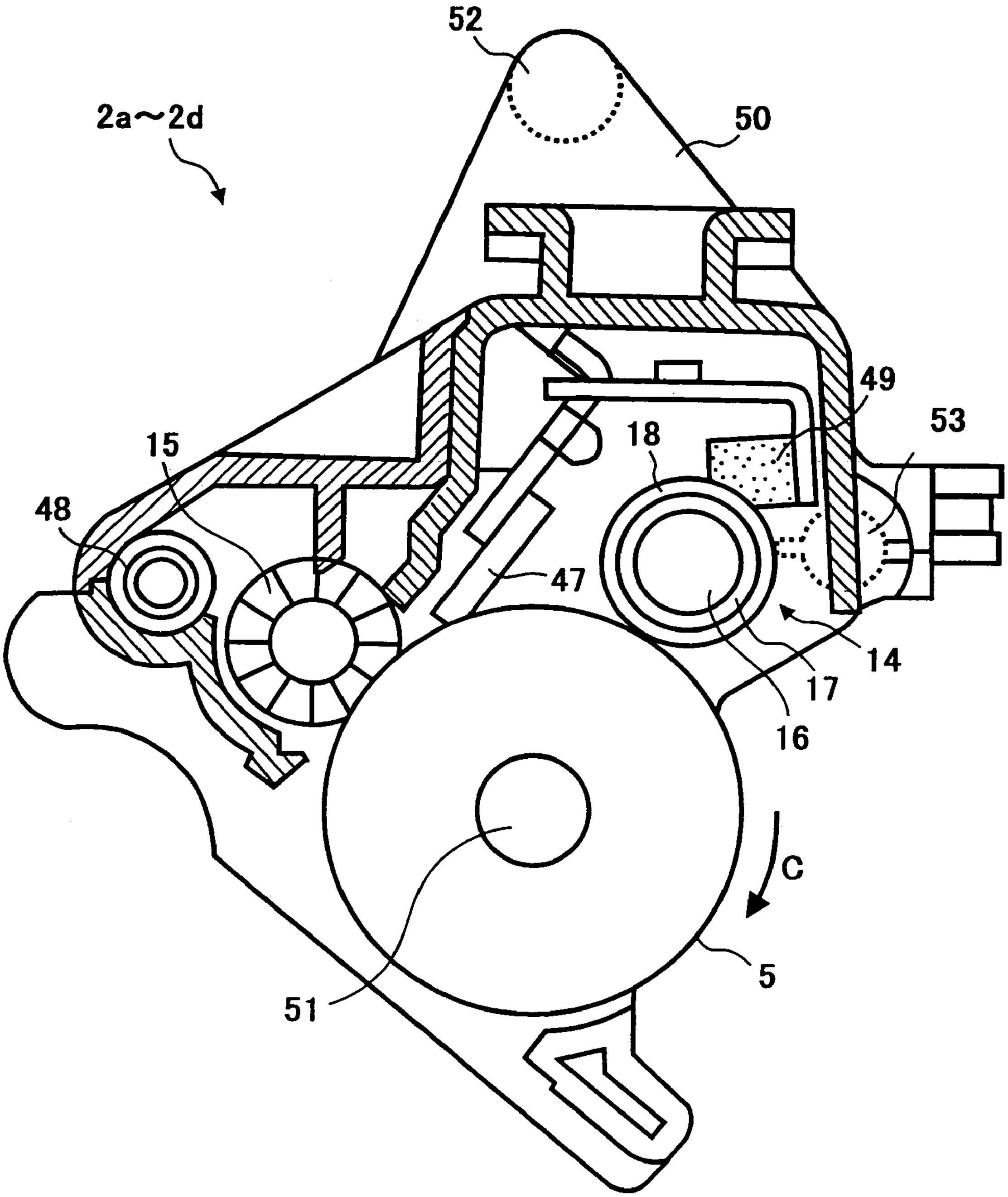
FIG. 6 is a schematic cross-sectional view of a photoconductor unit included in the full color compact printer of FIG. 5.

As illustrated in FIG. 6, each of the photoconductive units 2*a*-2*d* includes the photoconductive drum 5, the charge roller 14, and a brush roller 15. In each of the photoconductive units 2*a*-2*d*, the charge roller 14 applies a charge to the surface of the photoconductive drum 5. The photoconductive drum 5 forms an electrostatic latent image through an exposure process. The brush roller 15 forms a cleaning mechanism for cleaning the surface of the photoconductive drum 5. Each of the photoconductive units 2*a*-2*d* is independently detachable from the main unit 1.

The photoconductive units 2*a*-2*d* may be configured without the brush roller 15. In this example being explained, the photoconductive drum 5 has a diameter of 30 mm, for example.

In each of the photoconductive units 2*a*-2*d*, the photoconductive drum 5 is rotated in a direction C (FIG. 6) at one of predetermined linear velocities such as 185 mm/s, 125 mm/s, and 62.5 mm/s depending on various print modes including monochrome speed-oriented, monochrome quality-oriented, color speed-oriented, and color speed-oriented modes. Each of the photoconductive units 2*a*-2*d* further includes a cleaning blade 47, a toner transfer auger 48, a charge roller cleaner 49, a bracket 50, a main reference portion 51, and first and second sub-reference portions 52 and 53. The cleaning blade 47 is arranged such that the top edge thereof contacts the surface of the photoconductive drum 5 to scrape the residual toner which is then moved to the toner transfer auger 48. The toner transfer auger 48 is rotated to transfer the residual toner to a residual toner container.

The charge roller cleaner 49 is made of sponge, for example, and is arranged to contact the surface of the elastic member 17 of the charge roller 14 so as to clean the depositions such as dust and toner particles off the surface.

The main reference portion 51, the sub-reference portions 52 and 53 are provided to the bracket 50. With the above three reference portions 51-53, each of the photoconductive unit 2*a*-2*d* can accurately determine an installation position relative to the main unit 1. The development units 10*a*-10*d* have a common configuration using a two-component development method and use different color toners. The development units 10*a*-10*d* use yellow, magenta, cyan, and black toner, respectively.

Figure 7:
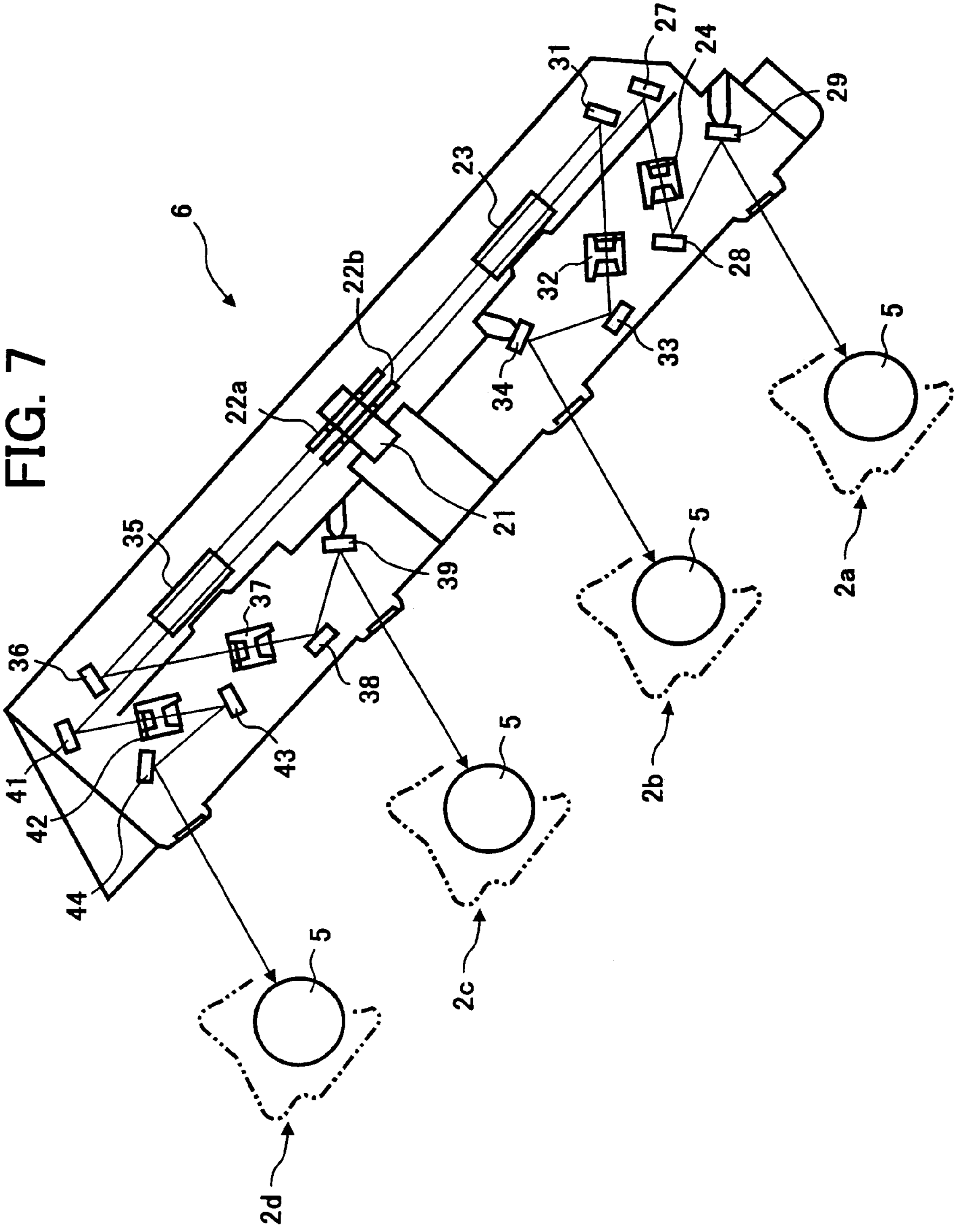
FIG. 7 is a schematic illustration of an optical writing unit included in the full color compact printer of FIG. 5.

As shown in FIG. 7, the optical writing unit 6 uses a laser diode (LD), not shown, to generate a beam for the color image and two beams for the monochrome image. The optical writing unit 6 includes a polygon motor 21 and rotary polygonal mirrors 22*a* and 22*b*, each having six surfaces. In the optical writing unit 6, the laser diode generates scanning beams for yellow and magenta images and those for cyan and black images so that the scanning beams for the yellow and magenta images are reflected to one side and those for the cyan and black images are reflected to the other side by the polygonal mirrors 22*a* and 22*b*.

Each of the scanning beams for the yellow and magenta images passes through a two-layered fθ lens 23. After the lens 23, the scanning beam for the yellow image is reflected by a mirror 27 and then passes through a long WTL 24. After that, the scanning beam for the yellow image is reflected by mirrors 28 and 29 to fall on the photoconductive drum 5 of the photoconductive unit 2*a*. The scanning beam for the magenta image is reflected by a mirror 31 after the lens 23 and passes through a long WTL 32. After that, the scanning beam for the magenta image is reflected by mirrors 33 and 34 to fall on the photoconductive drum 5 of the photoconductive unit 2*b*.

Each of the scanning beams for the cyan and black images passes through a two-layered fθlens 35. After the lens 35, the scanning beam for the cyan image is reflected by a mirror 36 and then passes through a long WTL 37. After that, the scanning beam for the yellow image is reflected by mirrors 38 and 39 to fall on the photoconductive drum 5 of the photoconductive unit 2*c*. The scanning beam for the black image is reflected by a mirror 41 after the lens 35 and passes through a long WTL 42. After that, the scanning beam for the black image is reflected by mirrors 43 and 44 to fall on the photoconductive drum 5 of the photoconductive unit 2*d*.

As shown in FIG. 5, the duplex unit 7 includes a pair of transfer guide plates 45*a* and 45*b* and a plurality of pairs of transfer rollers 46. In this example, four pairs of transfer rollers 46 are provided. In a duplex print mode, the duplex unit 7 receives the recording sheet P which is flipped via a reverse path 54 of the sheet flipping unit 8 after the print process performed on the front surface of the recording sheet P. Then, the duplex unit 7 send the recording sheet P to the image forming mechanism having the photoconductive units 2*a*-2*d*. The sheet flipping unit 8 includes pairs of transfer rollers 8*a* and pairs of transfer guides 8*b* so that the recording sheet P can be transferred to the duplex unit 7 after the sheet flipping process in the duplex print mode, straight to outside the printer 200, or to outside the printer 200 after the sheet flipping process.

The sheet cassettes 11 and 12 are provided with sheet pick-up mechanisms 55 and 56 for picking up the recording sheet P one by one and feeding it into a transfer mechanism of the printer 200.

The printer 200 applies a roller curvature separation method for separating the recording sheet P from the rotating photoconductive drum 5 and, for this purpose, includes four transfer brushes 57 arranged inside the transfer belt 3. In the printer 200, each of the photoconductive drums 5 is rotated clockwise in FIG. 5 when the image forming process started. The surface of the photoconductive drum 5 is charged by applying a voltage between the photoconductive drum 5 and the charge roller 14 of the corresponding charging unit.

The charged surface of the photoconductive drum 5 of the photoconductive unit 2*a* is exposed to the laser beam corresponding to the yellow image and which is emitted from the optical writing unit 6, thereby forming a latent image corresponding to the yellow color. The charged surface of the photoconductive drum 5 of the photoconductive unit 2*b* is exposed to the laser beam corresponding to the magenta image and which is emitted from the optical writing unit 6, thereby forming a latent image corresponding to the magenta color. The charged surface of the photoconductive drum 5 of the photoconductive unit 2*c* is exposed to the laser beam corresponding to the cyan image and which is emitted from the optical writing unit 6, thereby forming a latent image corresponding to the cyan color. The charged surface of the photoconductive drum 5 of the photoconductive unit 2*d* is exposed to the laser beam corresponding to the black image and which is emitted from the optical writing unit 6, thereby forming a latent image corresponding to the black color.

The latent images are respectively moved to developing positions of the development units 10*a*-10*d* by the rotations of the photoconductive drums 5 and are developed into toner images with the yellow, magenta, cyan, and black toners.

During the above operations, the recording sheet P is supplied from the sheet cassette 11 by the sheet pick-up mechanism 56, or from the sheet cassette 12 by the sheet pick-up mechanism 57, into the transfer mechanism. Then, the recording sheet P is stopped by a pair of registration rollers 59 deposited in front of the photoconductive unit 2*a*. After that, the recording sheet P is further transferred in synchronism with the movement of the toner image moved by the rotation of the photoconductive drums 5 of the photoconductive unit 2*a*. The recording sheet P is guided into a sheet path between the photoconductive drum 5 of the photoconductive unit 2*a* and the transfer belt 3.

During the above process, the recording sheet P is charged to a positive polarity by a sheet attracting roller 58 arranged close to an entrance area of the transfer belt 3 and is attracted to the surface of the transfer belt 3 by an electrostatic force. The recording sheet P is attached to the transfer belt 3 and is transferred in the sheet flow direction. Then, the yellow, magenta, cyan, and black toner images are in turn transferred onto a front surface of the recording sheet P, or an upper surface in FIG. 5. When the recording sheet P passes by the photoconductive unit 2*d*, the transfer of the yellow, magenta, cyan, and black toner images into a full color toner image on the front surface of the recording sheet P is completed. Thereby, the recording sheet P has the full color toner image made of the overlaid yellow, magenta, cyan, and black toner images.

Then, the fixing unit 9 melts and hardens the full color toner image onto the recording sheet P with heat and pressure. After that, the recording sheet P is differently treated depending upon the various print modes. In one mode, the recording sheet P is ejected to the facedown tray 26. In anther mode, the recording sheet P is transferred into the sheet flipping unit 8 and is straightly ejected in a faceup orientation. In another mode, the recording sheet P is flipped in the sheet flipping unit 8 and is ejected in a facedown orientation.

Further, in a duplex print mode, the recording sheet P is flipped through the reverse path 54 in the sheet flipping unit 8 and is transferred to the duplex unit 7. Then, the flipped recording sheet P is transferred to the image forming mechanism having the photoconductive units 2*a*-2*d* and receives a full color toner image on its rear surface. The recording sheet P is then ejected in the manner as described above.

If the print operation for two or more sheets is instructed, the above image forming processes are repeated.

In the charge roller 14 of the above printer 200, the film strips 18 are wrapped and fixed by adhesion around the respective end side surfaces of the elastic member 17 in the circumferential direction thereof. Specifically, each of the film strips 18 is fixed to the elastic member 17 such that the tilt edges 18*a* and 18*b* are not overlapped each other to form the space S therebetween and that there is no position in the circumferential direction around the elastic member 17 at which the film strip 18 does not exists in the axis direction indicated by the arrow E, as shown in FIG. 2.

As described above, if the square-formed film strip 61 is used in place of the film strip 18, it forms the horizontal space b, as illustrated in FIG. 3. Therefore, it would generate a position in the circumferential direction around the elastic member 17 at which the film strip 61 does not exists in the axis direction indicated by the arrow E. In this case, when the horizontal space b faces surface of the rotating photoconductive drum 5, the photoconductive drum 5 would slightly fall into the horizontal space b during every rotation. This would cause a vibration of the photoconductive drum 5.

However, the above problem is eliminated with the charge roller 14 using the film strips 18. Since the film strip 18 is wrapped around the elastic member 17 so as to form the space S between the tilt edges 18*a* and 18*b*, as shown in FIG. 2, even if the film strip 18 has unevenness in length in the wrapping direction, it can easily be adjusted by displacing the adhering positions of the tilt edges 18*a* and 18*b* while maintaining the space S between the tilt edges 18*a* and 18*b*. Therefore, the film strip 18 does not require a severe manufacturing accuracy in dimension even in the wrapping direction.

In addition, even though the tilt edges 18*a* and 18*b* are not contact each other, since the tilt edges 18*a* and 18*b* are angled relative to the axis direction E (FIG. 2) and face each other to form the space S therebetween, there is no position in the circumferential direction around the elastic member 17 at which the film strip 18 does not exists in the axis direction E.

Therefore, the photoconductive drum 5 is kept in contact with the film strip 18 at the end side surfaces thereof when rotating. That is, a gap G (FIG. 4) between the photoconductive drum 5 and the film strips 18 is held at a constant value.

In addition, since the photoconductive drum 5 is kept in contact with the film strip 18 when rotating, as described above, the photoconductive drum 5 does not fall into the space S during every rotation and, as a result, it causes no vibration.

Figure 8:
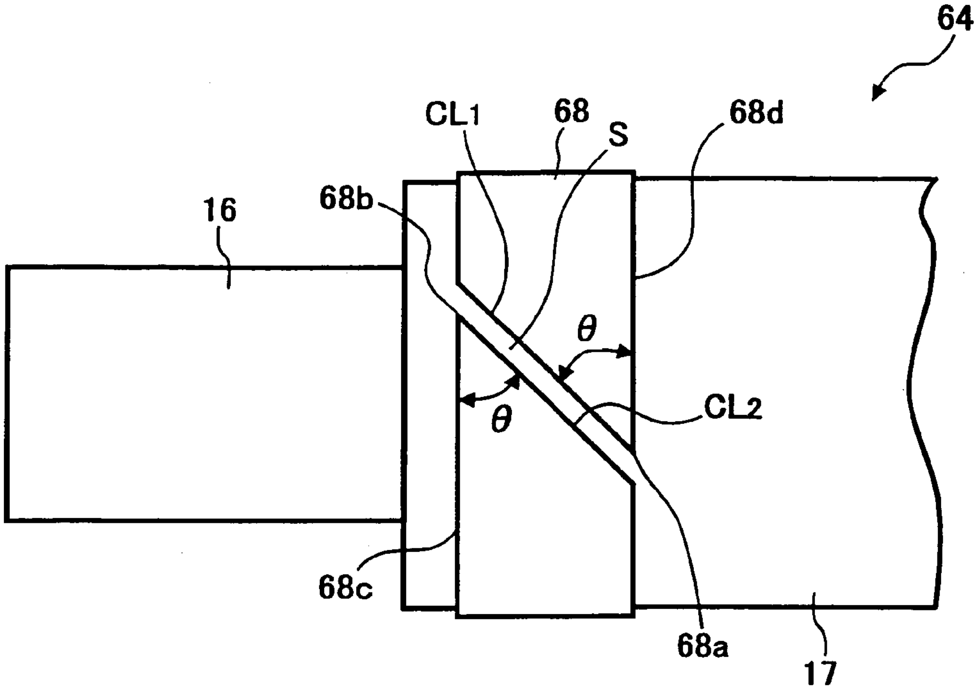
FIG. 8 is a schematic diagram showing an end side of another charge roller according to the present invention, where another film strip is wrapped.

Referring to FIG. 8, a charge roller 64 according to an embodiment of the present invention is explained. FIG. 8 shows one side of the charge roller 64 and the other side thereof is not shown since it has the same structure. The charge roller 64 is similar to the charge roller 14 of FIG. 1, except for film strips 68 used in place of the film strips 18. Each of the film strips 68 has tilt edges 68*a* and 68*b*. The film strips 68 are similar to the film strips 18, except for the angles of the tilt edges 68*a* and 68*b*. That is, the tilt edges 68*a* and 68*b* have an angleθ of approximately 45 degrees relative to side edges 68*c* and 68*d*, respectively.

With the arrangement of the tilt edges 68*a* and 68*b* to have the angle âl= of approximately 45 degrees relative to the side edges 68*c* and 68*d*, respectively, the top edges 68*e* and 68*f* of each film strip 68 have sufficient adhering area and are firmly adhered to the elastic member 17. In addition, a sufficient amount of a contact width Wa (explained later with reference to FIG. 10) of the film strip 68 with the photoconductive drum 5 can be obtained.

Figure 9:
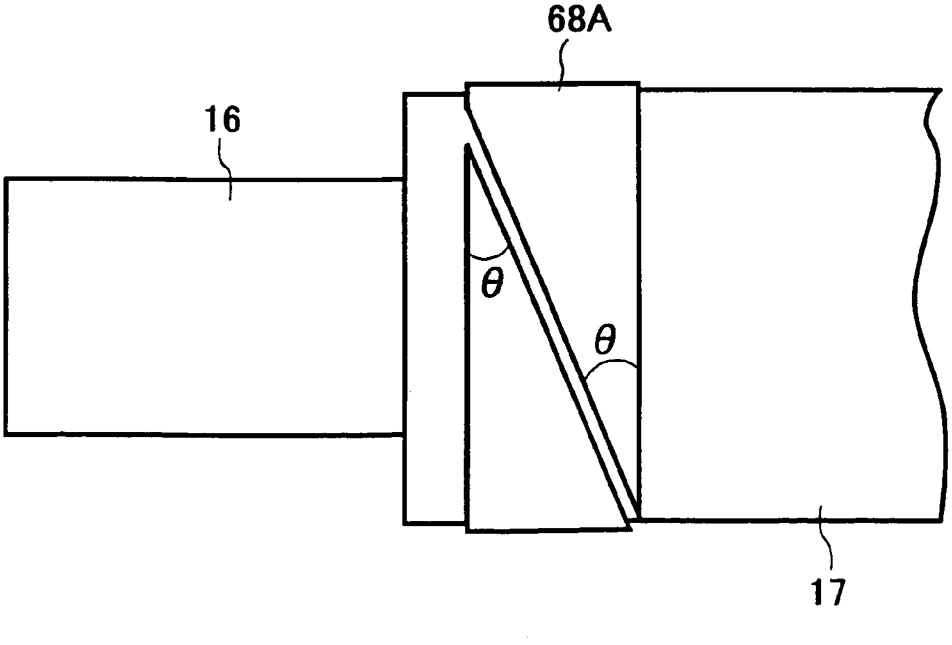
FIG. 9 is a schematic diagram showing the end side of the charge roller of FIG. 8, where a comparatively undesirable film strip is wrapped.

If the angle θ of the tilt edges 68*a* and 68*b* is set to an acute angle such as the one smaller than the 45 degrees, as shown in FIG. 9, the top edges 68*e* and 68*f* of each film strip 68A have insufficient adhering area and, as a result, the adherence to the elastic member 17 will be weakened. In this case, since the charge roller 64 is in contact with the photoconductive drum 5 under pressure with the springs 19 via the film strips 68A, portions of the elastic member 17 under the film strips 68A may be deformed and, as a result, the film strips 68A are peeled off.

Figure 10:
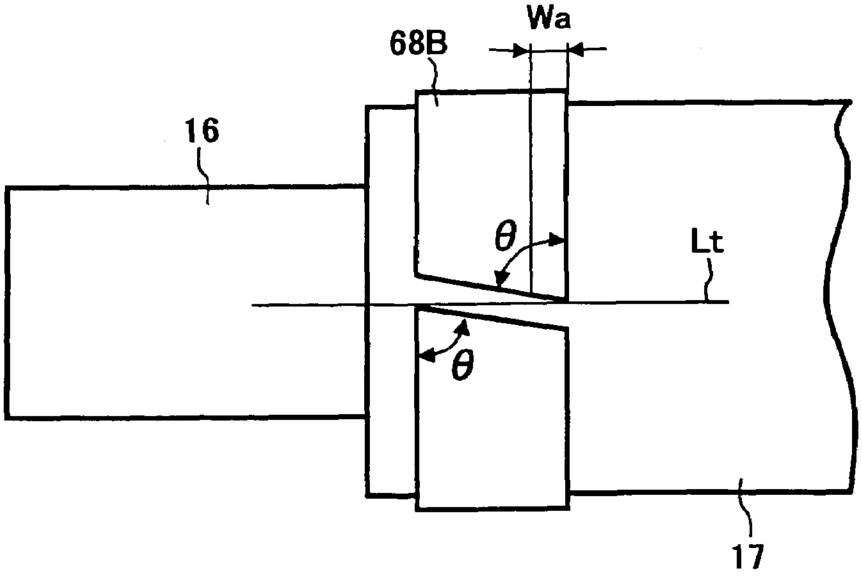
FIG. 10 is a schematic diagram showing the end side of the charge roller of FIG. 8, where another comparatively undesirable film strip is wrapped.

On the contrary, if the angle θ of the tilt edges 68*a* and 68*b* is set to a greater angle such as the one close to 90 degrees, as shown in FIG. 10, the top edges 68*e* and 68*f* of each film strip 68B have a greater adhering area and, as a result, the adherence to the elastic member 17 will be increased. However, the contact width Wa on a contact line Lt between the film strip 68B and the photoconductive drum 5 would be made too small. In this case, when the film strips 68B come to contact the photoconductive drum 5 at the smaller contact width Wa, the portions of the elastic member 17 under the film strips 68B will receive a greater pressure and will be deformed such that the gap G (FIG. 4) between the surfaces of the elastic member 17 and the photoconductive drum 5 is made smaller. As a result, the film strips 68B are peeled off.

Figure 11:
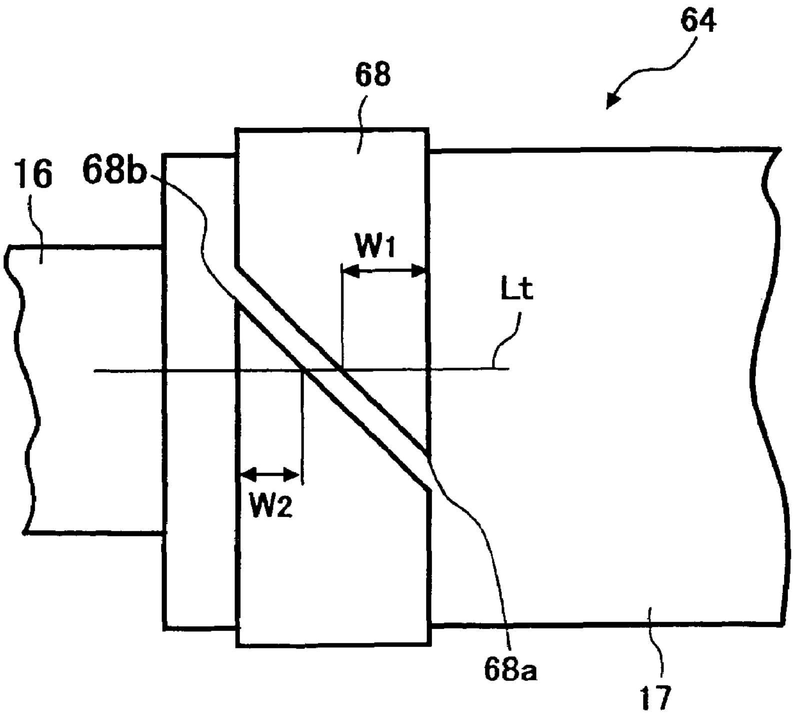
FIG. 11 is a schematic diagram for explaining a contact width of the film strip of the charge roller of FIG. 8.

In the charge roller 64 of FIG. 8, however, the tilt edges 68*a* and 68*b* of the film strips 68 are given the angle of approximately 45 degrees relative to the side edges 68*c* and 68*d*, respectively, and therefore the top edges 68*e* and 68*f* are firmly adhered to the elastic member 17. At the same time, as shown in FIG. 11, the contact width Wa on the contact line Lt between the film strip 68 and the photoconductive drum 5 is increased and is the sum of contact widths W1 and W2. Therefore, application of uneven pressure to the elastic member 17 can be prevented.

Figure 12:
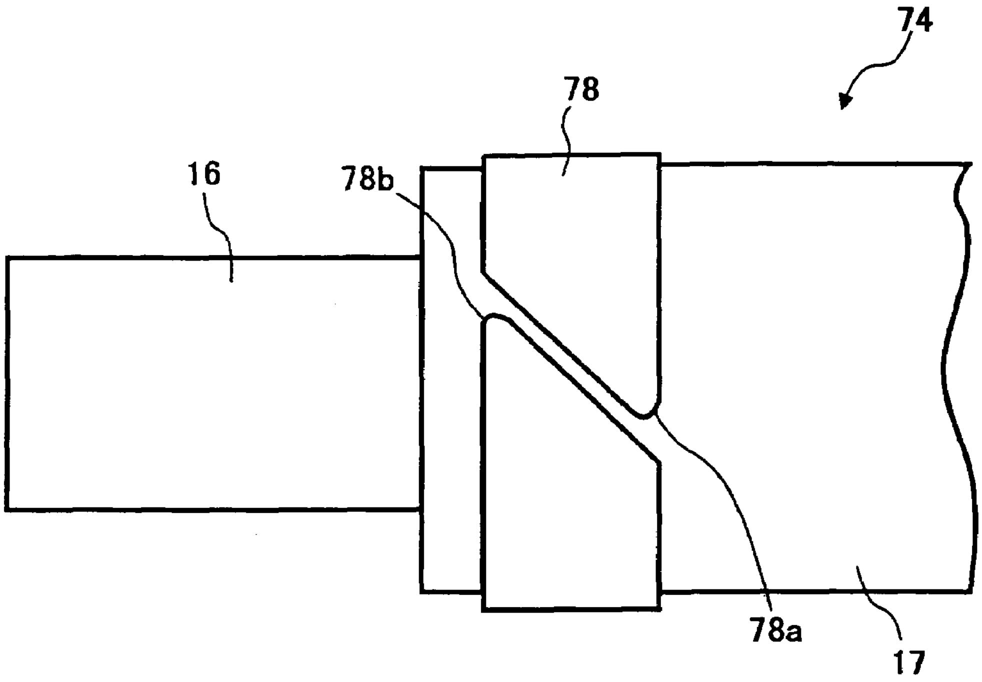
FIG. 12 is a schematic diagram showing an end side of another charge roller according to an embodiment of the present invention, where a film strip having round tops is wrapped.

Referring to FIG. 12, a charge roller 74 according to an embodiment of the present invention is explained. FIG. 12 shows one side of the charge roller 74 and the other side thereof is not shown since it has the same structure. The charge roller 74 is similar to the charge roller 14 of FIG. 1, except for film strips 78 used in place of the film strips 18. The film strips 68 are similar to the film strips 18, except for the shapes of the top edges 78*e* and 78*f*. That is, the top edges 78*e* and 78*f* are rounded with a round of 1 mm. With such shape, the film strips 78 are not prone to peeling off from the top edges 78*e* and 78*f*.

Figure 13:
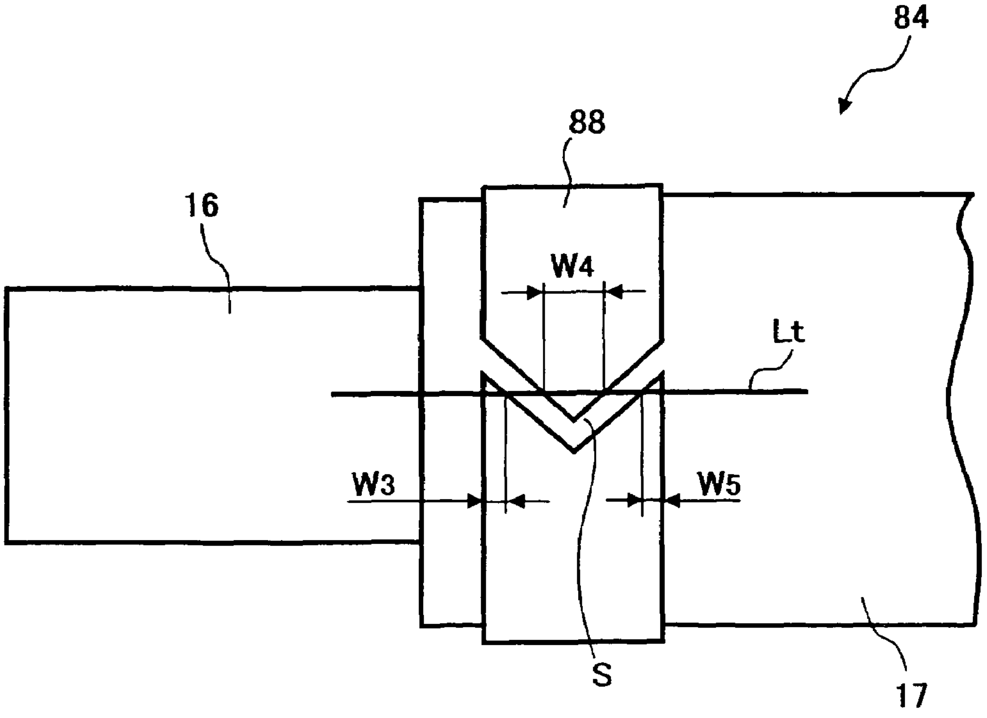
FIG. 13 is a schematic diagram showing an end side of another charge roller according to an embodiment of the present invention, where a film strip having a non-straight-line space is wrapped.
Figure 14:
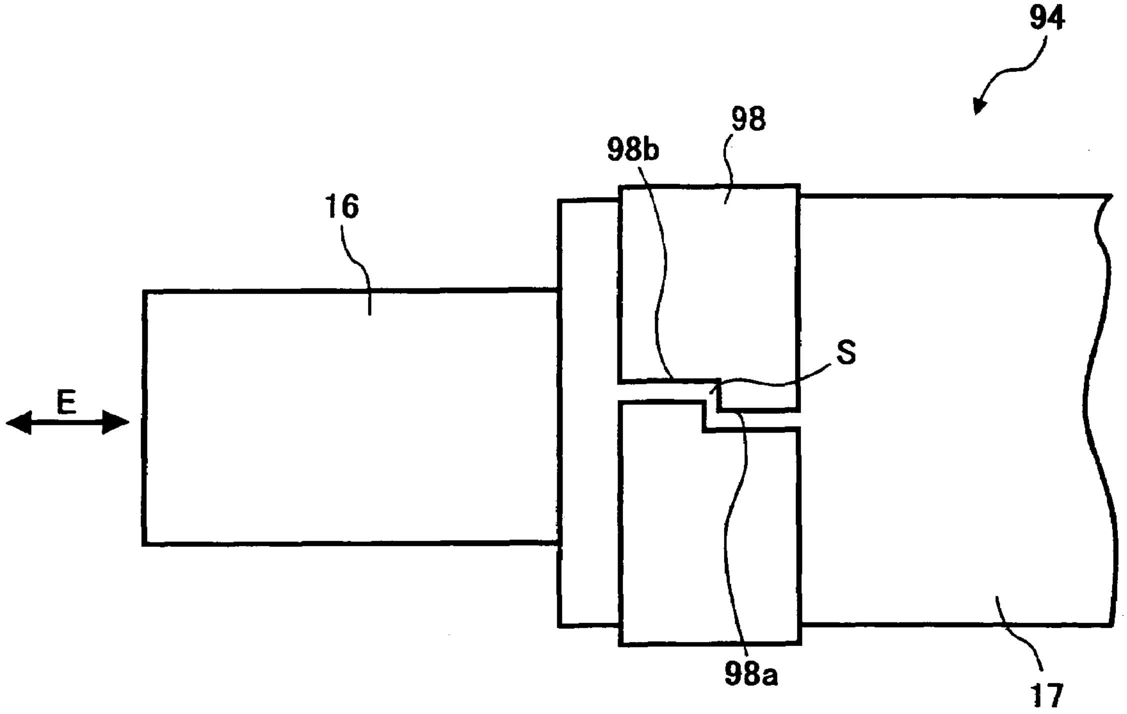
FIG. 14 is a schematic diagram showing an end side of another charge roller according to an embodiment of the present invention, where another film strip having a non-straight-line space is wrapped.
Figure 15:
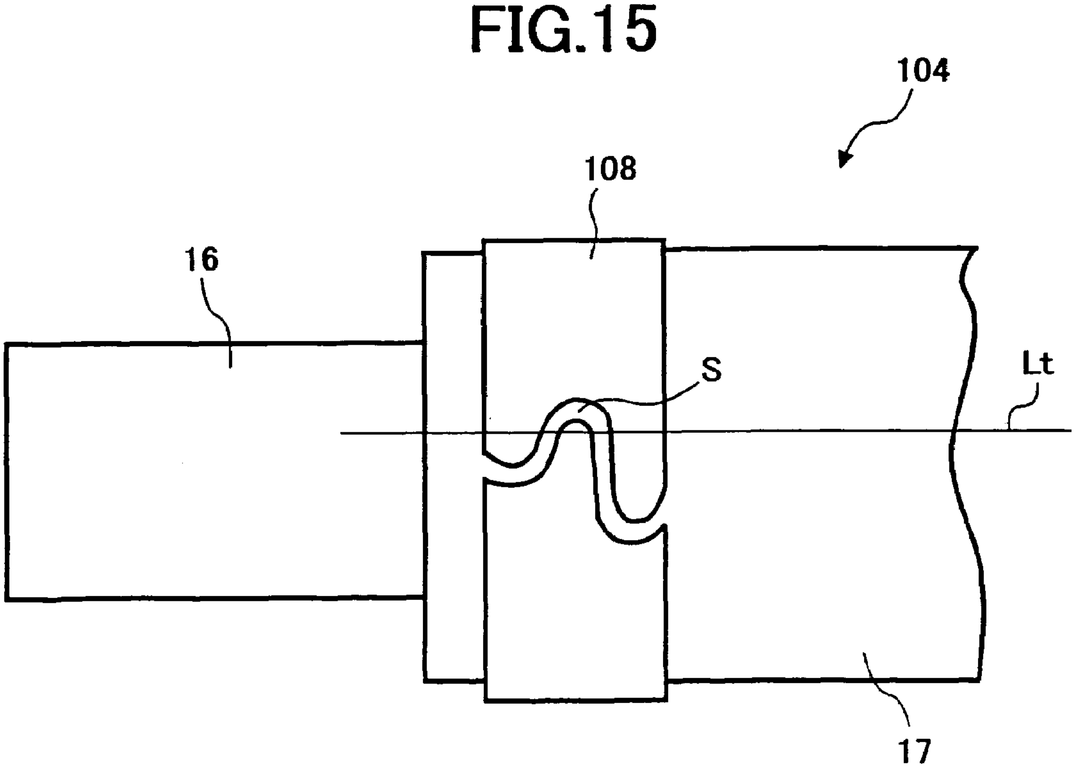
FIG. 15 is a schematic diagram showing an end side of another charge roller according to an embodiment of the present invention, where another film strip having a non-straight-line space is wrapped.

Referring to FIGS. 13-15, different examples of the charge roller according to the embodiment of the present invention are explained. The examples of FIGS. 13-15 have the film strips having the cut edges in different shapes.

FIG. 13 shows a charge roller 84 according to the embodiment of the present invention. The charge roller 84 is similar to the charge roller 14 of FIG. 1, except for film strips 88 used in place of the film strips 18. The film strips 88 are similar to the film strips 18, except for the shapes of the edges 88*a* and 88*b*. That is, the edges 88*a* and 88*b* are formed in a V-like shape. In this example, the edges 88*a* and 88*b* face each other and the space S is formed in a V-like shape. With such shape, even when the space S of the film strips 88 comes to contact the photoconductive drum 5, the elastic member 17 under the film strips 88 will receive a constant pressure and therefore the gap G (FIG. 4) between the surfaces of the elastic member 17 and the photoconductive drum 5 is made constant. At this time, the contact width Wa on the contact line Lt between the film strip 88 and the photoconductive drum 5 is the sum of contact widths W3, W4, and W5. Therefore, since the pressure is shared by the three portions, application of uneven pressure to the elastic member 17 can be prevented.

FIG. 14 shows a charge roller 94 according to the embodiment of the present invention. The charge roller 94 is similar to the charge roller 14 of FIG. 1, except for film strips 98 used in place of the film strips 18. The film strips 98 are similar to the film strips 18, except for the shapes of the edges 98*a* and 98*b*. That is, the edges 98*a* and 98*b* are formed in a cranked-shape. In this example, the edges 98*a* and 98*b* face each other and the space S is formed in a cranked-shape. With such shape, even when the space S of the film strips 98 comes to contact the photoconductive drum 5, the elastic member 17 under the film strips 98 will receive a constant pressure and therefore the gap G (FIG. 4) between the surfaces of the elastic member 17 and the photoconductive drum 5 is made constant.

In addition, even if the film strip 98 has unevenness in length in the wrapping direction, it can easily be adjusted by displacing the adhering positions of the edges 98*a* and 98*b* while maintaining the space S between the tilt edges 98*a* and 98*b*. Therefore, the film strip 98 does not require a severe manufacturing accuracy in dimension even in the wrapping direction.

FIG. 15 shows a charge roller 104 according to the embodiment of the present invention. The charge roller 104 is similar to the charge roller 14 of FIG. 1, except for film strips 108 used in place of the film strips 18. The film strips 108 are similar to the film strips 18, except for the shapes of the edges 108*a* and 108*b*. That is, the edges 108*a* and 108*b* are formed in a curved-line including three rounds, as shown in FIG. 15. The edges 108*a* and 108*b* face each other and the space S is formed in a curbed-line. With such shape, even when the space S of the film strips 108 comes to contact the photoconductive drum 5, the elastic member 17 under the film strips 108 will receive a constant pressure and therefore the gap G (FIG. 4) between the surfaces of the elastic member 17 and the photoconductive drum 5 is made constant. At this time, the contact width on the contact line Lt between the film strip 108 and the photoconductive drum 5 is the sum of the three contact widths, as is so in the charge roller 84 of FIG. 13. Therefore, since the pressure is shared by the three portions, application of uneven pressure to the elastic member 17 can be prevented.

Figure 16:
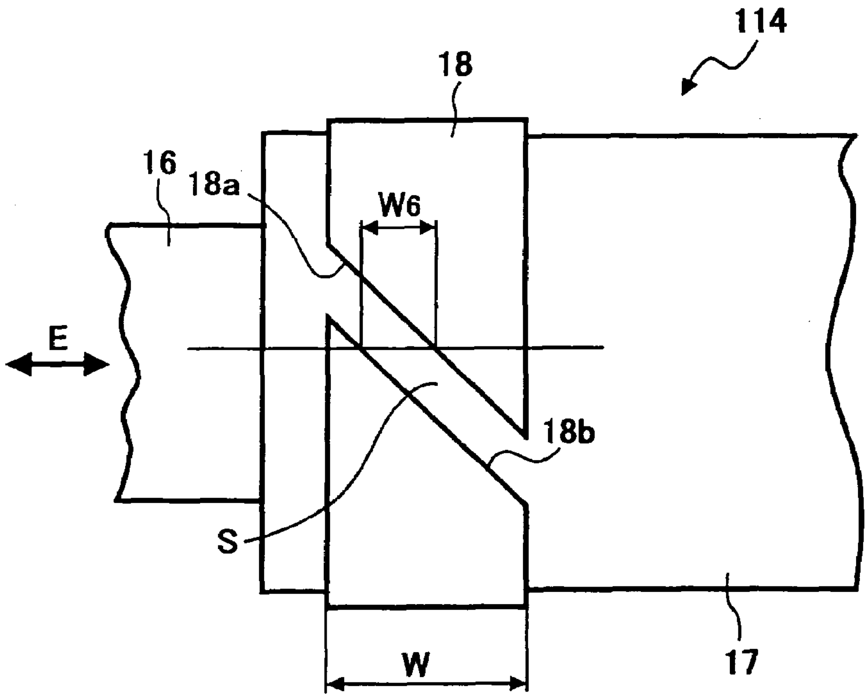
FIG. 16 is a schematic diagram showing an end side of another charge roller according to an embodiment of the present invention, where a film strip regulated by the contact width is used.

Referring to FIG. 16, a charge roller 114 according to the embodiment of the present invention is explained. FIG. 16 shows one side of the charge roller 114 and the other side thereof is not shown since it has the same structure. The charge roller 114 is similar to the charge roller 14 of FIG. 1, except for dimensions of the space S. That is, the space S is defined such that a width W6 of the space S in the direction E is 50% or less relative to the width W of the film strip 18. For example, the width W is set to 8 mm and the width W6 is set to a length in a range of from 0.5 mm to 1.0 mm.

Therefore, the contact width at a position where the space S is included is maintained as equal to or greater than a half value of the contact width at a position where the space S is not included. As a result, the variations of the contact width can be made relatively small. Accordingly, since the pressure applied to the elastic member 17 during the time in contact with the photoconductive drum 5 is changed in accordance with the change of the above contact width, the variations of that pressure applied to the elastic member 17 can be made relatively small.

Figure 17:
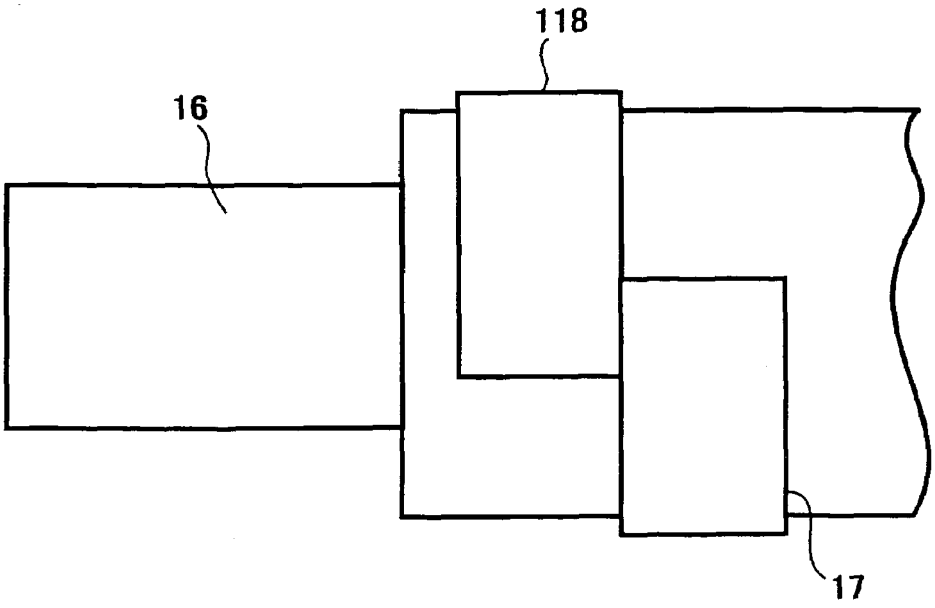
FIG. 17 is a schematic diagram showing the end side of the charge roller of FIG. 16, where a comparatively undesirable film strip is used.

If square-cut film strips 118 are used and are wrapped around the elastic member 17 in a way such that end edges thereof are overlapped each other in the shaft direction without being overlapped each other in the direction perpendicular to the shaft direction, as shown in FIG. 17, the contact width is changed between a value of the width of the film strip 118 and a twice value of the same during one rotation of the charge roller.

In this case, if the twice value of the contact width at the place where the film strip 118 is overlapped is defined as a reference value of 100, the comparative value at the place where the film strip 118 is not overlapped can be defined as a value of 50. Accordingly, the contact width of the photoconductive drum 5 relative to the film strip 118 during one rotation of the charge roller is changed from 100 to 50. Therefore, the smallest contact width becomes a half of the greatest contact width and the variations of the contact width becomes greater than that of the charge roller 114 of FIG. 16. As a result, the elastic member 17 of the charge roller 114 of FIG. 16 will receive less uneven pressure than that of FIG. 17.

Figure 18:
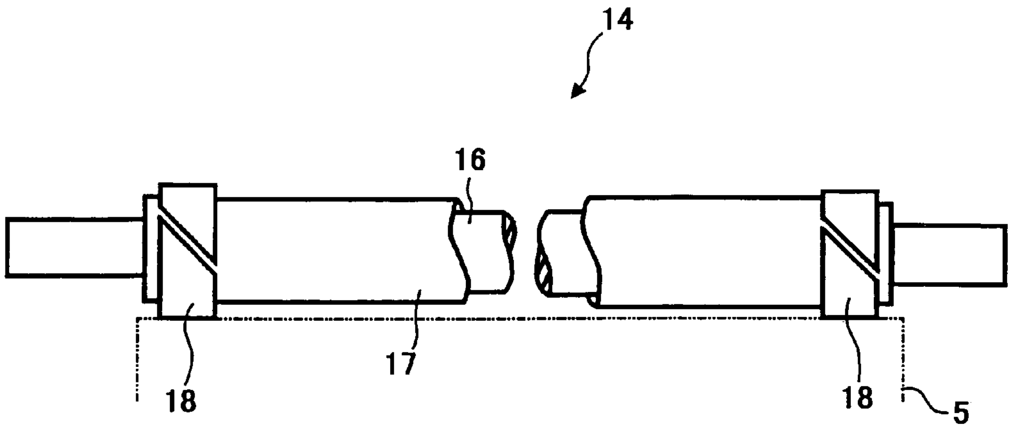
FIG. 18 is a schematic diagram for explaining a benefit of using the same film strips on both end of the charge roller of FIG. 1.

FIG. 18 shows the charge roller 14 of FIG. 1 in its entire length. As shown in FIG. 18, the film strips 18 are wrapped around the both end side surfaces of the elastic member 17. In this case, a common type of the film strip 18 is used and therefore a number of the parts items of the charge roller 14 is decreased. In addition, by using a common type of the film strip 18, an error in assembling the parts may be prevented.

Figure 19:
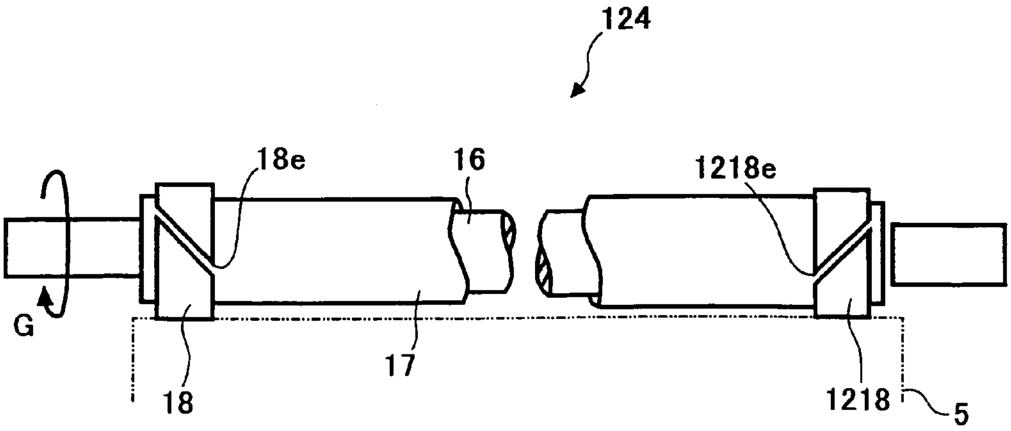
FIG. 19 is a schematic diagram of another charge roller according to an embodiment of the present invention, where the film strips are symmetrically positioned.

FIG. 19 shows a charge roller 124 according to an embodiment of the present invention. The charge roller 124 of FIG. 19 is similar to the charge roller 14 of FIG. 18, except for a film strip 1218. In this example, the film strip 18 is wrapped around one end side surface of the elastic member 17 and a film strip 1218 is wrapped around the other end side surface of the elastic member 17 such that they are symmetrically placed relative to the center of the axis of the elastic member 17, as shown in FIG. 19.

In the charge roller 124, the top edge 18*e* of the film strip 18 and a top edge 1218*e* of the film strip 1218 are placed inside as leading edges in a rotation direction indicated by an arrow G to face each other.

If the acute-angled top edges 18*e* and 1218*e* are placed as leading edges in the rotation direction G, the top edges 18*e* and 1218*e* are prone to be peeled off when the charge roller 124 is rotated under pressure relative to the photoconductive drum 5. This is because the end side surfaces of the elastic member 17 are prone to receive greater pressure from the photoconductive drum 5 than inside surfaces thereof. Therefore, the above charge roller 124 of FIG. 19 is resistant to such a drawback in that the top edges of the film strips are peeled off.

Figure 20:
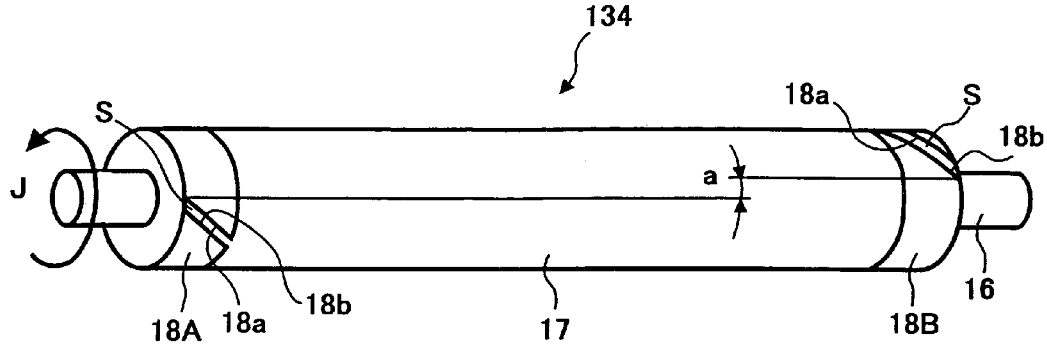
FIG. 20 is a schematic diagram of another charge roller according to an embodiment of the present invention, where the film strips are displaced in a circumferential direction.

FIG. 20 shows a charge roller 134 according to an embodiment of the present invention. The charge roller 134 of FIG. 20 is similar to the charge roller 14 of FIG. 18, except for positions of the film strips. For the convenience sake, the film strips are given reference numeral 18A and 18B. In FIG. 20, the film strip 18A is wrapped around a left end side surface of the elastic member 17 and the film strip 18B is wrapped around a right end side surface thereof. The charge roller 134 is rotated in a direction J. The film strips 18A and 18B are positioned so as to have a distance a in a direction perpendicular to the roller axis between the leading edge of the space S at the film strip 18A in the direction J and the trailing edge of the space S at the film strip 18B in the direction J, as shown in FIG. 20. Such distance a is defined as greater than 0.

By thus placing the film strips 18A and 18B with the distance a on the end side surfaces of the elastic member 17, the leading edges of the spaces S of the film edges 18A and 18B do not contact the photoconductive drum 5 at the same time. Therefore, even if each of the leading edges of the spaces S may cause vibrations of the photoconductive drum 5 in every rotation, such vibrations are not caused at the same time on both end side surfaces of the elastic member 17.

When the leading edges of the spaces S of the film strips 18A and 18B are placed opposite each other relative to the rotation axis of the charge roller 134, intervals of the vibrations may be made longer. Therefore, the rotation of the photoconductive drum 5 becomes stable.

Figure 21:
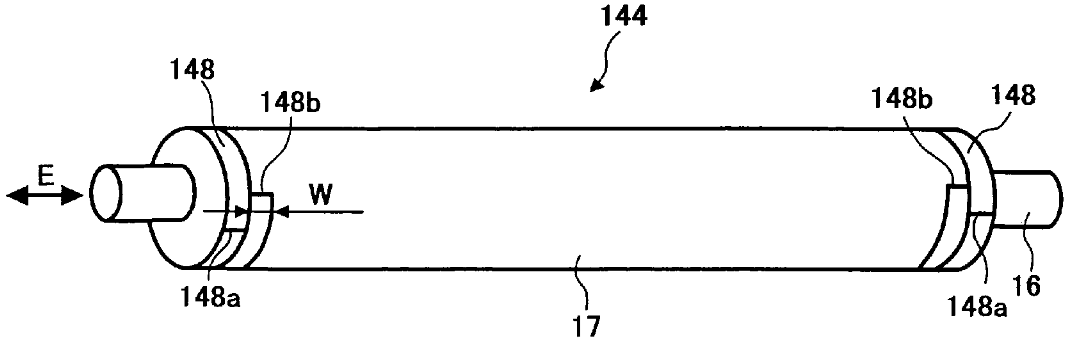
FIG. 21 is a schematic diagram of another charge roller according to an embodiment of the present invention, where each of the film strips is wrapped with a slight displacement.

FIG. 21 shows a charge roller 144 according to an embodiment of the present invention. The charge roller 144 of FIG. 21 is similar to the charge roller 134 of FIG. 20, except for film strips 148. Each of the film strips 148 has a length longer than a circumferential length of the elastic member 17. The film strips 148 are turned around the end side surfaces of the elastic member 17 such that the leading edge 148*a* and the trailing edge 148*b* are displaced for the amount of the width W so as not to be overlapped in the direction E with both trailing edges 148*b* placed inside.

In this case, even if the film strips 148 have unevenness length in the wrapping direction, it can easily be adjusted by displacing the adhering positions of the leading and trailing edges 148*a* and 148*b* while they are maintained not to be overlapped each other in the direction E. Therefore, the film strip 148 does not require a severe manufacturing accuracy in dimension even in the wrapping direction.

Figure 22:
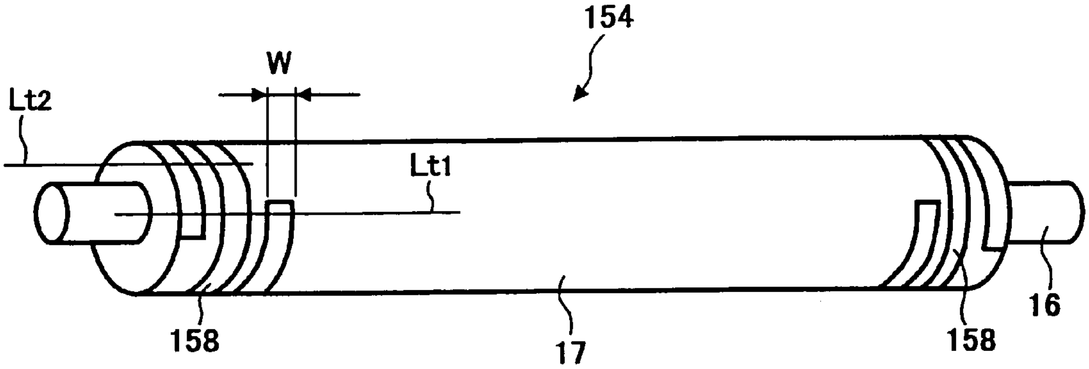
FIG. 22 is a schematic diagram of another charge roller according to an embodiment of the present invention, where each of the film strips is wrapped more than two turns.

Further, in this case, since there is no position in the circumferential direction around the elastic member 17 at which the film strip 148 does not exists in the axis direction E, the photoconductive drum 5 causes no vibration due to the space S during the rotation. FIG. 22 shows a charge roller 154 according to an embodiment of the present invention. The charge roller 154 of FIG. 22 is similar to the charge roller 144 of FIG. 21, except for film strips 158. Each of the film strips 158 has a length twice longer than a circumferential length of the elastic member 17 and is turned for at least twice around one end side surface of the elastic member 17 without overlapping in the direction E and with the trailing edge 148*b* placed inside.

In this case, when the photoconductive drum 5 contacts the film strips 158 on the contact line Lt1 across three times of the width W at one end, the contact width is equal to a value three times of the width W. When the photoconductive drum 5 contacts the film strips 158 on the contact line Lt2 across two times of the width W at one end, the contact width is equal to a value two times of the width W. That is, the contact width is changed between two and three times of the width W during one turn of the charge roller 154.

This makes the variations of the contact width comparatively smaller than the case of the film strip 148 shown in FIG. 21 in which the contact width is changed between one and two times of the width W during one turn of the charge roller 144. As a result, the variations of the pressure applied to the film strip 158 is made comparatively smaller.

In addition, the greater the number of turns of the film strips, the smaller the variations of the contact width of the film strips relative to the photoconductive drum. Therefore, an event in that the pressure is intensively applied to a specific part of the film strip can be avoided.

Figure 23:
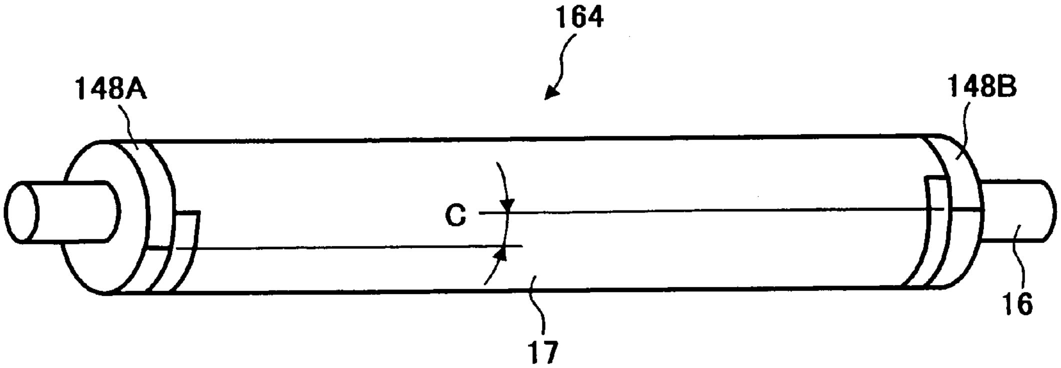
FIG. 23 is a schematic diagram of another charge roller according to an embodiment of the present invention, where start positions of wrapping the film strips are displaced to each other in the circumferential direction.

FIG. 23 shows a charge roller 164 according to an embodiment of the present invention. The charge roller 164 of FIG. 23 is similar to the charge roller 144 of FIG. 21, except for positions of film strips 148A and 148B. Each of the film strips 148A and 148B has a length longer than a circumferential length of the elastic member 17 and is similar to the film strips 148 of FIG. 21. As shown in FIG. 23, the trailing edges of the both film strips 148A and 148B relative to the elastic member 17 are positioned at a predetermined distance C apart in the circumferential direction of the elastic member 17.

By thus arranging the charge roller 164, the positions at which the respective contact widths of the film strips 148A and 148B relative to the photoconductive drum are varied are apart for the predetermined distance C in the circumferential direction of the elastic member 17 and therefore an event in that the variations of the contact widths of the film strips 148A and 148B occur at the same time is avoided.

In addition, it may also be preferable that the leading edges of both film strips 148A and 148B relative to the elastic member 17 are positioned at a distance apart in the circumferential direction of the elastic member 17.

Figure 24:
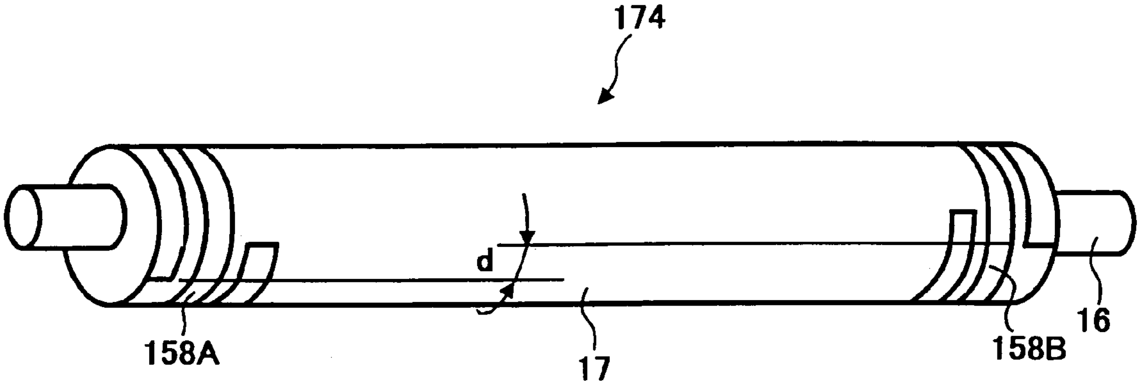
FIG. 24 is a schematic diagram of another charge roller according to an embodiment of the present invention, where each of the film strips is wrapped more than two turns and start positions of wrapping the film strips are displaced to each other in the circumferential direction.

FIG. 24 shows a charge roller 174 according to an embodiment of the present invention. The charge roller 174 of FIG. 24 is similar to the charge roller 154 of FIG. 22, except for positions of film strips 158A and 158B. Each of the film strips 158A and 158B has a length at least two times longer than a circumferential length of the elastic member 17 and is similar to the film strips 158 of FIG. 22. As shown in FIG. 24, the trailing edges of the both film strips 158A and 158B relative to the elastic member 17 are positioned at a predetermined distance d apart in the circumferential direction of the elastic member 17. By thus arranging the charge roller 174, the positions at which the respective contact widths of the film strips 158A and 158B relative to the photoconductive drum are varied are apart for the predetermined distance d in the circumferential direction of the elastic member 17 and therefore an event in that the variations of the contact widths of the film strips 158A and 158B occur at the same time is avoided.

In addition, it may also be preferable that the leading edges of both film strips 158A and 158B relative to the elastic member 17 are positioned at a distance apart in the circumferential direction of the elastic member 17.

Figure 25:
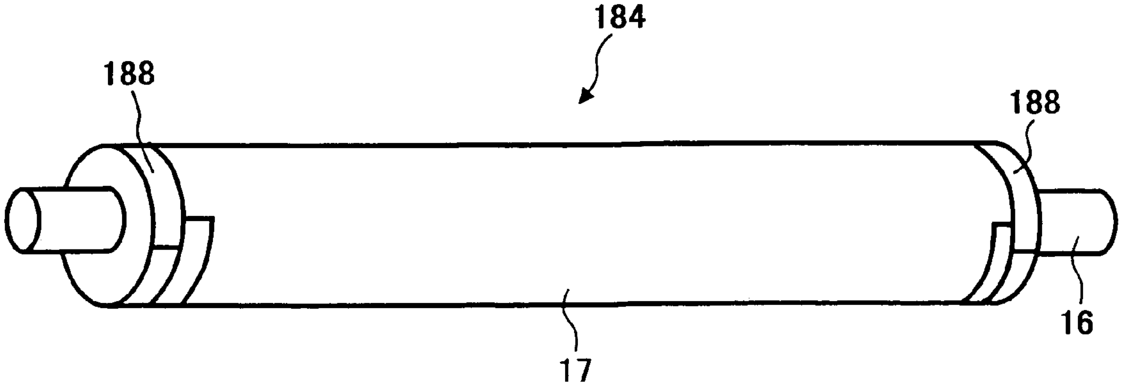
FIG. 25 is a schematic diagram for explaining a benefit of using the same film strips on both end of the charge roller of FIG. 21.

FIG. 25 shows a charge roller 184 according to an embodiment of the present invention. The charge roller 184 of FIG. 25 is similar to the charge roller 144 of FIG. 21, except for film strips 188 and 188. As shown in FIG. 25, the film strips 188 are wrapped around the both end side surfaces of the elastic member 17 in a manner similar to that shown in FIG. 21. In this case of FIG. 25, the film strip 188 is commonly used and therefore a number of the parts items of the charge roller 184 is decreased. In addition, by using a common type of the film strip 188, an error in assembling the parts may be prevented.

Figure 26:
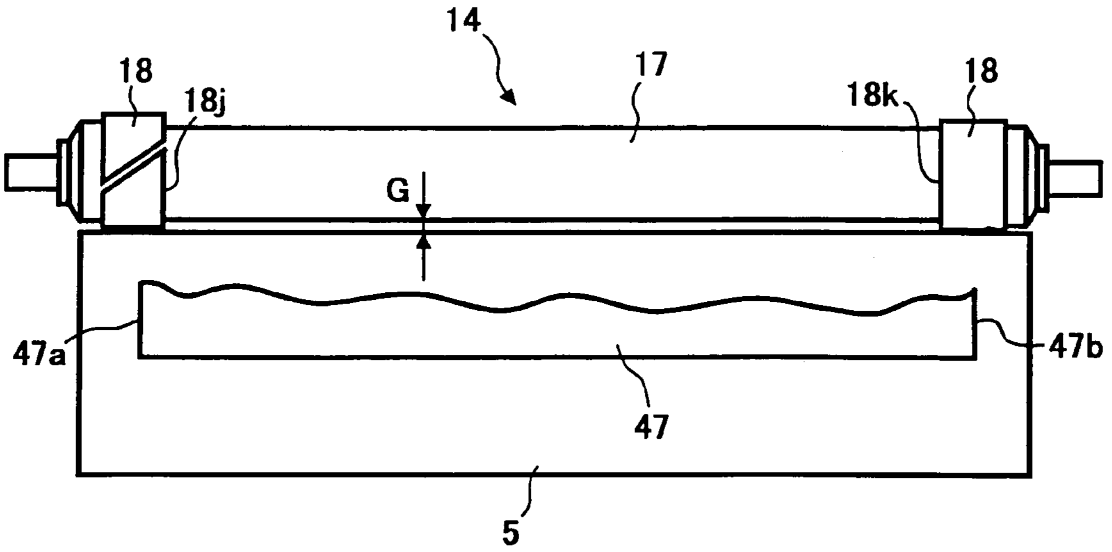
FIG. 26 is a schematic diagram for showing a relationship between a width of a cleaning blade and positions of two film members wrapped around both ends of a charging roller used in a charging apparatus according to an embodiment of the present invention.

Referring to FIG. 26, another charging roller wrapped with the film strips at the both ends thereof according to an embodiment of the present invention is explained. The charging roller of FIG. 26 is similar to that of FIG. 6, except for a relationship between the positions of the film strips 18 and the cleaning blade 47. As shown in FIG. 26, the length of the cleaning blade 47 is made longer than the distance of the two film strips 18. Thai is, both ends 47*a* and 47*b* of the cleaning blade 47 are positioned relatively outside from inside edges 18*j* and 18*k*, respectively, of the film strips 18. With this configuration, the cleaning blade 47 can perfectly perform the cleaning process relative to an entire image forming area preserved on the surface of the photoconductive drum 5 and which is regulated by the inside edges 18*j* and 18*k* of the film strips 18.

Accordingly, the cleaning blade 47 can clean off the residual toner after the transfer process so as to prevent an event in that the residual toner enters the effective charging area of the charge roller 14.

If the residual toner is moved to the area close to the gap between the photoconductive drum 5 and the charge roller 14, the residual toner is prone to be attached to the effective charging area of the charge roller 14 and, as a result the charging performance of the charge roller 14 will accordingly be degraded. However, with the above configured cleaning blade 47, the charge roller 14 can be kept clean so that an occurrence of an abnormal image forming due to the dirty charge roller 14 can be prevented.

If the film strips 18 are fixed on the photoconductive drum 5 and the cleaning blade 47 is positioned such that the both edges 47*a* and 47*b* contact the film strips 18, wearing will occur on both the cleaning blade 47 and the film strips 18. This will make the gap between the photoconductive drum 5 and the charge roller 14 smaller than a predetermined value. However, in this example of FIG. 26, the film strips 18 are fixed on the charge roller 14 and the cleaning blade 47 is positioned such that the both edges 47*a* and 47*b* do not contact the film strips 18. Therefore, the above-mentioned wearing will not occur.

Figure 27:
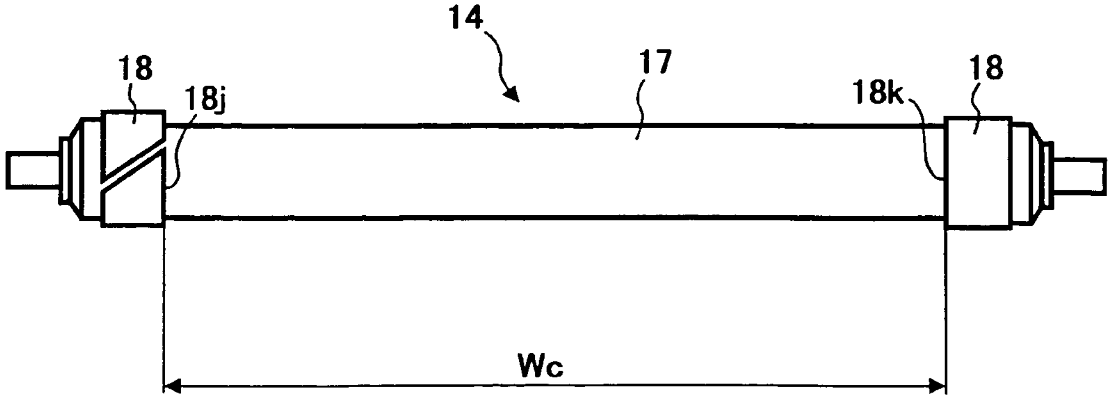
FIG. 27 is a schematic diagram for explaining an effective charging width applied to the charging apparatus of FIG. 26.
Figure 34:
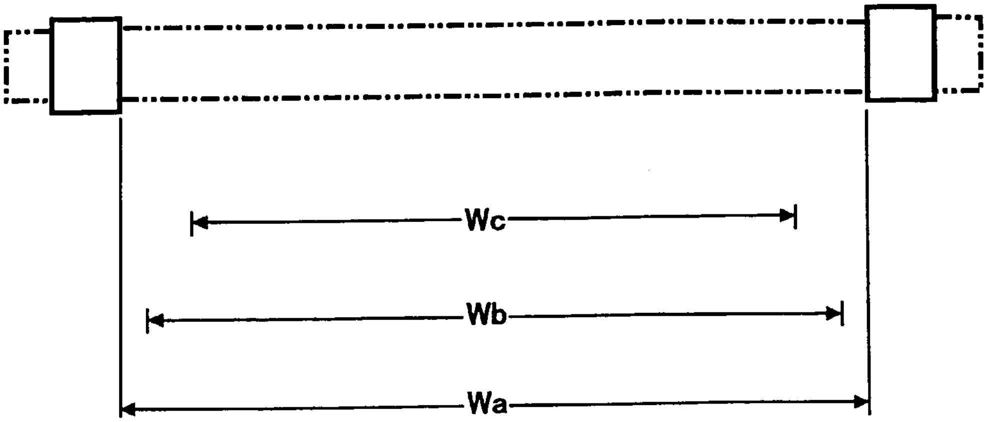
FIG. 34 BACKGROUND ART
FIG. 34 is a schematic diagram for explaining a relationship among an effective cleaning width, an effective charging width, and inside distance of two film members wrapped around both ends of a photoconductive drum applied to a conventional charging apparatus.
Figure 35:
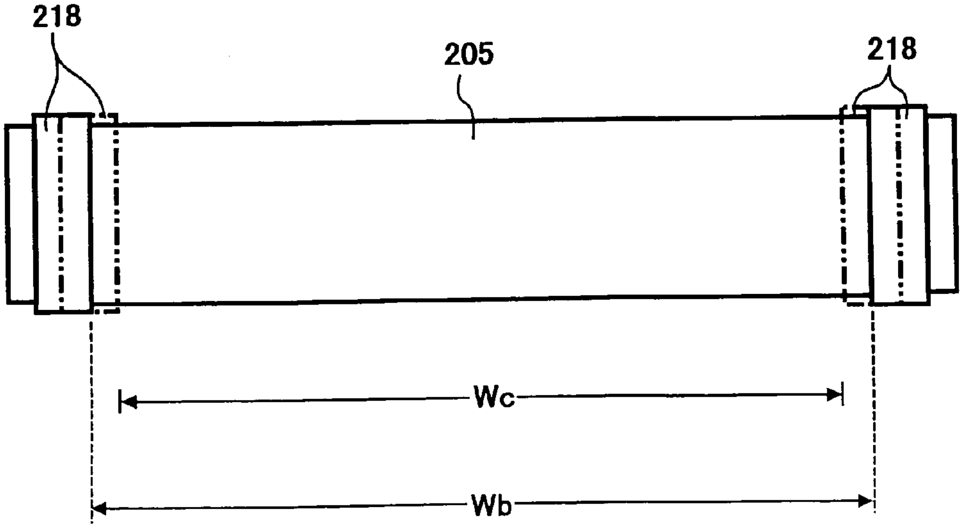
FIG. 35 BACKGROUND ART
FIG. 35 is a schematic diagram for showing an example of a photoconductive drum wrapped with the film members in a conventional charging apparatus.

In addition, by providing the film strips 18 to the charge roller 14, the distance between the two film strips 18 can comparatively be made short. That is, when the film strips 18 are attached to the photoconductive drum 5, the effective cleaning width Wb is needed to be within the inside distance between the two film members Wa, as shown in FIG. 34. However, in this example of FIG. 26, the effective charging width Wc can be made equal to the inside distance between the film members we, as shown in FIG. 27.

In the above case, the inside distance between the film strips 18 is made short and therefore it becomes easy to provide straightness to the photoconductive drum 5 at the required level. This contributes to the reduction of the manufacturing cost.

Figure 28:
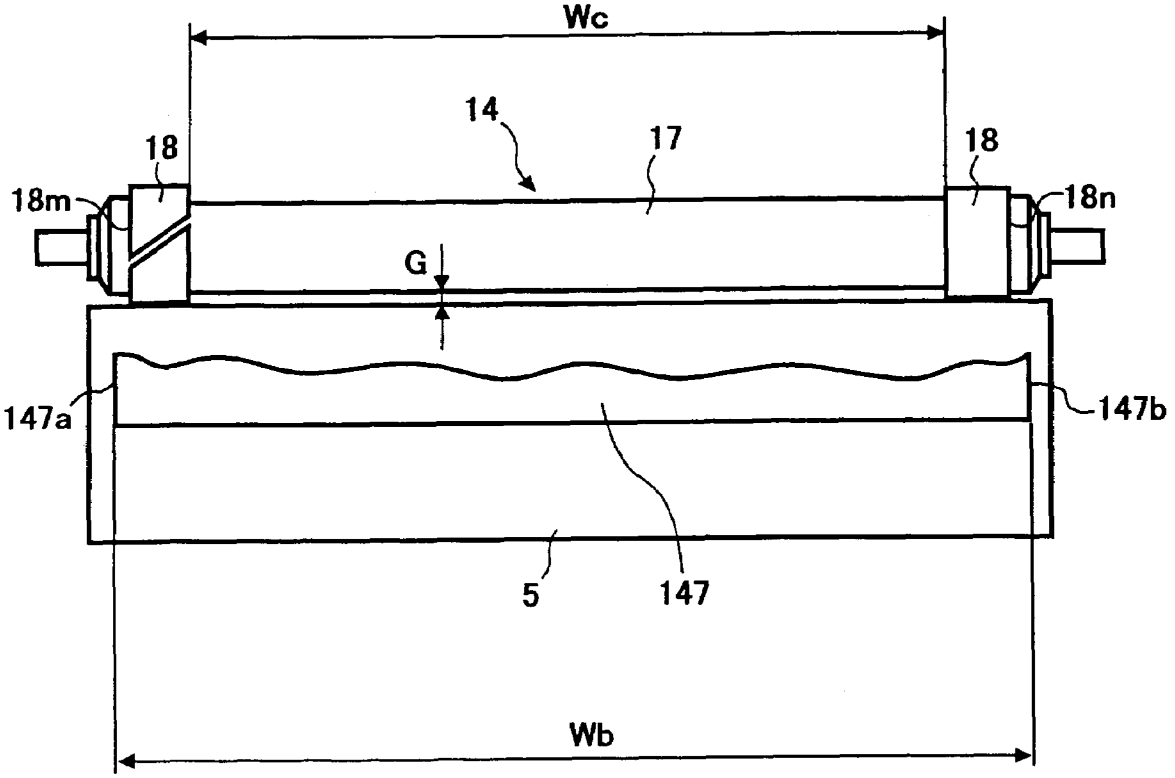
FIG. 28 is a schematic diagram for showing a relationship between a width of a cleaning blade and positions of two film members wrapped around both ends of a charging roller used in another charging apparatus according to an embodiment of the present invention.

FIG. 28 shows an application of the above charge roller 14 to the photoconductive drum 5 having a wider cleaning blade 147. In this case, the cleaning blade 147 are positioned such that both edges 147*a* and 147*b* of the cleaning blade 147 are positioned outside of outside edges 18*m* and 18*n* of the film strips 18. That is, the effective charging width is set to 308 mm, the width of each film strip 18 is set to 8 mm, and the effective cleaning width is set to 326 mm.

In those type of the charge roller having a structure as illustrated in FIG. 1, the film strips are needed to be tightly adhered to the elastic member and entrance of toner particles must be prevented. If the toner particles enters between the film strips and the elastic member, it will cause various problems. For example, wearing will occur inside the film strips. The gap between the charge roller 14 and the photoconductive drum 5 may be affected by the entrance of toner particles.

Therefore, the film strips are tightly adhered to the elastic member with a specific adhesive agent to prevent the entrance of toner particles. In the example being explained, an adhesive sheet is used as the film strip 18 on which an adhesive layer is coated. The material of such adhesive sheet may be any one of polyimide, polyester, and polytetrafluoroethylene, as well as polypropylene, polyester, and polyethylene terephthalate. By using such adhesive sheet, it will be possible to maintain its thickness with a tolerance of from ±5 μm to ±10 μm.

Even with the above film member made of an adhesive sheet, it still has a risk of the entrance of the toner particles to the adhesive layer of the film member, which may gradually cause the film member to be peeled off from the edges.

However, in the example of FIG. 28, the cleaning blade 147 is positioned such that the edges 147*a* and 147*b* of the cleaning blade 147 are positioned outside of the outside edges 18*m* and 18*n*. With this configuration, the cleaning blade 147 can glean off the sufficiently large part of the surface of the photoconductive drum 5 so as to prevent the residual toner to be transferred to the film strips 18.

Figure 29:
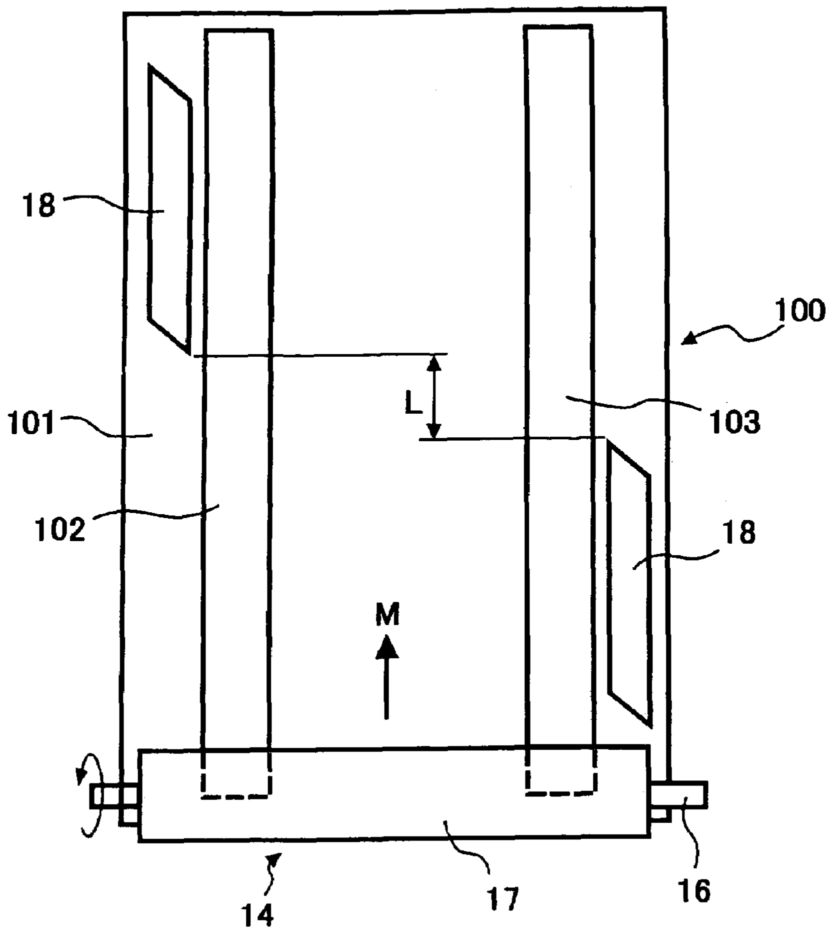
FIG. 29 is an exemplary film wrapping apparatus for explaining a method of preparing a charge roller according to an embodiment of the present invention.

Referring to FIG. 29, a method of wrapping and fixing the film strips around both end side surfaces of the elastic member of the charge roller is explained. In this method, the film strips 18, for example, are wrapped and fixed around the both end side surfaces of the elastic member 17 of the charge roller 14, for example, of FIG. 1. The method of FIG. 29 uses a film wrapping bed 100 to wrap and fix the film strips 18 around the both end side surfaces of the elastic member 17.

The film wrapping bed 100 includes a film placement plate 101 configured to include a plane upper surface. The film wrapping bed 100 further includes a pair of roller rails 102 and 103. The roller rails 102 and 103 are fixed in parallel with a predetermined distance from each other on the film placement plate 101. The predetermined distance is determined such that the charge roller 14 can be placed on the roller rails 102 and 103 nearly around the end side surfaces of the elastic member 17 thereof, as shown in FIG. 29. Each of the roller rails 102 and 103 has a thickness approximately equal to that of the film strips 18.

The above method includes the following steps. Two film strips 18 that are cut in a predetermined length and have an adhesive surface are placed on the film placement plate 101 with their adhesive surfaces away from the film placement plate 101. The film strips 18 are placed at positions outside the respective roller rails 102 and 103 in parallel to the roller rails, and corresponding to the positions of the end side surfaces of the elastic member 17. Further, the positions of the two film strips 18 on the film placement plate 101 are at a predetermined distance L apart from each other in the vertical direction in FIG. 29. Then, the charge roller 14 is placed on the film placement plate 101 such that surfaces of the elastic member 17, near the end sides of the elastic member 17, contact the roller rails 102 and 103, as shown in FIG. 1. After that, the charge roller 14 is moved for rotation in a direction M and, as a result, the two film strips 18 are wrapped and fixed around the end side surfaces of the elastic member 17 of the charge roller 14.

The film strip 18 is thin and is therefore easy to form wrinkles. With the above method, however, such a film strip 18 can easily be wrapped and fixed in a fine shape around the end side surface of the elastic member 17.

In this case, the spaces S formed between the leading and trailing edges 18*a* and 18*b* of both the film strips 18 are located at the predetermined distance L apart from each other in the circumferential direction of the charge roller 14.

Figure 30:
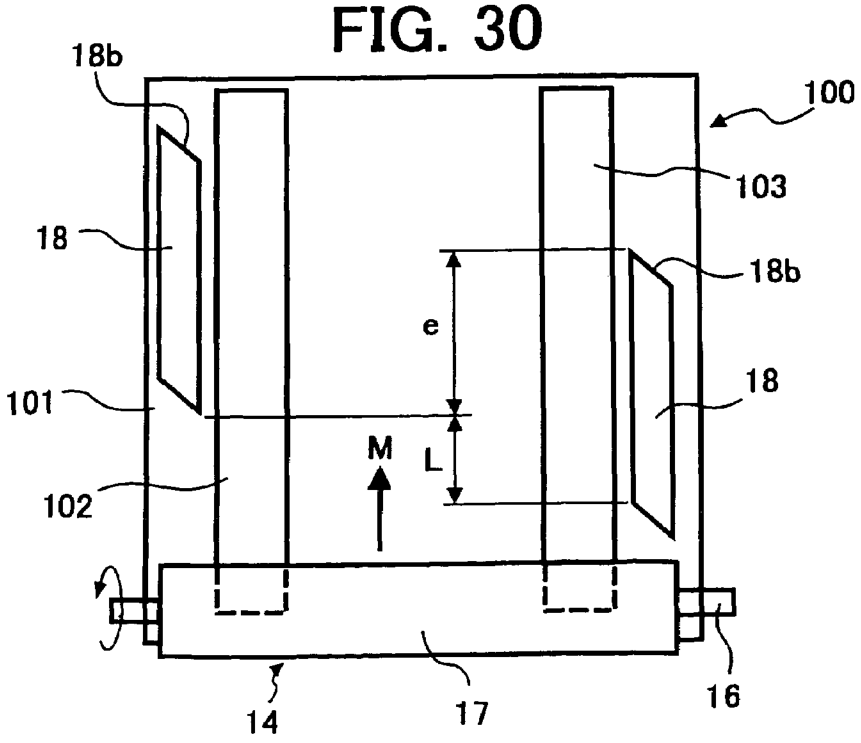
FIG. 30 is an exemplary film wrapping apparatus for explaining another method of preparing a charge roller according to an embodiment of the present invention.
Figure 31:
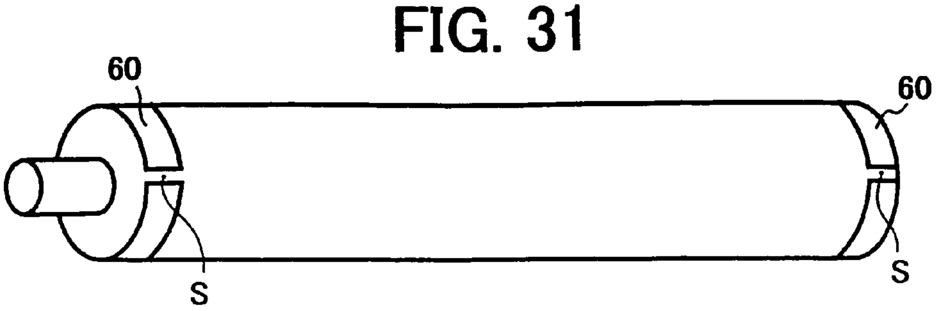
FIG. 31 is a schematic diagram of a conventional charge roller having the film strip wrapped in an undesirable manner.
Figure 32:
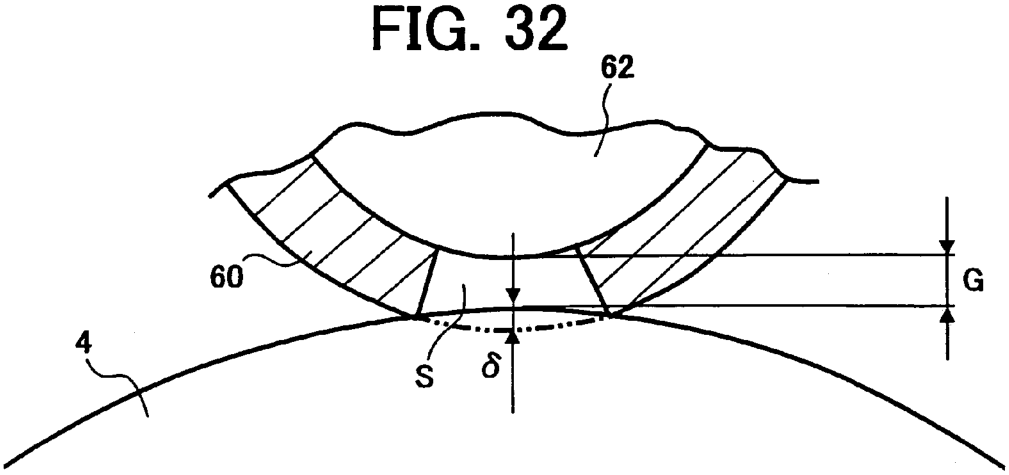
FIG. 32 is a schematic cross-sectional view for showing contact surfaces of the charge roller of FIG. 31 and a photoconductive member at a position where the edges of the film strip meet with a gap.
Figure 33:
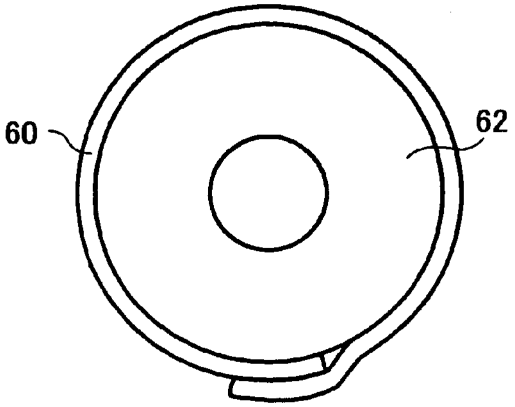
FIG. 33 is a schematic cross-sectional view of the charge roller of FIG. 31 having the film strip wrapped in another undesirable manner.

Referring to FIG. 30, another method of wrapping and fixing the film strips around both end side surfaces of the elastic member of the charge roller is explained. This method is similar to the method shown in FIG. 29, except for the positions of the film strips 18 on the film placement plate 101. The method of FIG. 30 uses the film wrapping bed, the film placement plate, and the pair of roller rails which have comparatively shorter lengths than those of the method shown in FIG. 29. However, for the sake of simplicity, these components are provided with the same labels as those of the method shown in FIG. 29.

In the method of FIG. 30, two film strips 18 that are cut in a predetermined length and have an adhesive surface are placed on the film placement plate 101, with their adhesive surfaces away from the film placement plate 101. The film strips 18 are placed at positions outside respective roller rails 102 and 103, in parallel to the roller rails, and corresponding to the positions of the end side surfaces of the elastic member 17. This step is similar to that in the method of FIG. 29. However, positions of the trailing edges 18*b* of the two film strips 18 on the film placement plate 101 are at a predetermined distance L apart from each other in the vertical direction in FIG. 30 so that the positions of the trailing edges 18*b* of the two film strips 18 on the film placement plate 101 are overlapped for a length e in the vertical direction in FIG. 30. Then, in a manner similar to that of the method of FIG. 29 the charge roller 14 is placed on the film placement plate 101 such that surfaces of the elastic member 17, near the end sides of the elastic member 17, contact the roller rails 102 and 103, as shown in FIG. 1. After that, the charge roller 14 is moved for rotation in a direction M and, as a result, the two film strips 18 are wrapped and fixed around the end side surfaces of the elastic member 17 of the charge roller 14.

With this method of FIG. 30, the moving distance of the charge roller 14 in the direction M is made shorter than that in the method of FIG. 29 and therefore, a more compact facility for wrapping and fixing the film strips to the elastic member can be provided. The above described various different charge rollers can be used as the charge roller in the compact full color printer 200 shown in FIG. 5. In addition, these charge rollers can also be used as a transfer roller, a discharging roller, and a development roller, which are the charged rollers arranged at positions to face the photoconductive member and to which voltages are applied.

The transfer roller is generally applied with a voltage so as to generate electrostatic force that causes a toner image formed on the surface of the photoconductive member to move onto a recording sheet. When one of the above different charge rollers is used as such transfer roller, it performs a stable transfer process. In addition, the surface of the transfer roller is held with no portion thereof in contact with the toner image formed on the photoconductive member because of the film strips wrapped around the end side surfaces of the elastic member of the transfer roller. As a result, an event in that the transfer roller receives the residual toner from the photoconductive member is avoided. This prevents a problem in which the backside of the recording sheet has dirty marks of such residual toner. The discharging roller is generally applied with a voltage so as to generate electrostatic force that causes the residual charge on the photoconductive member to drain off. When one of the above different charge rollers is used as such discharging roller, the surface of the discharging roller is held with a constant gap relative to the surface of the photoconductive member because of the film strips wrapped around the end side surfaces of the elastic member of the transfer roller. As a result, the discharging roller performs a stable discharging process.

Further, the development roller is generally applied with a voltage so as to generate electrostatic force that causes the toner particles on the photoconductive member to raise in a chaplet-like form having a certain height. When one of the above different charge rollers is used as such development roller, the surface of the development roller is held with a constant gap relative to the raised toner on the surface of the photoconductive member because of the film strips wrapped around the end side surfaces of the elastic member of the transfer roller. As a result, the development roller performs a stable development process.

Numerous additional modifications and variations of the present application are possible in light of the above teachings. It is therefore to be understood that within the scope of the appended claims, the present application may be practiced otherwise than as specifically described herein.

What is claimed as new and is desired to be secured by Letter Patent of the United States is:

1. A method of preparing a charge roller, comprising:

arranging two parallel rails on a plate such that when an unfinished charge roller is placed on the rails, the ends of an elastic member wrapped around a metal core of said unfinished charge roller are outside the rails;

setting two film members in parallel to each other with respective adhesive surfaces facing away from the plate such that the two film members are outside and parallel to respective edges of said rails and leading edges of said two film members are positioned at different distances from said unfinished charge roller;

placing said unfinished charge roller on said rails so that the ends of said elastic member wrapped around said metal core of said unfinished charge roller are placed outside said rails; and moving said unfinished charge roller by rotation along said pair of rails so that said two film members are adhered with said respective adhesive surfaces to said both ends of said elastic member wrapped around said metal core of said unfinished charge roller.

2. The method of claim 1, further comprising:

starting an adherence of a first film member of said two film members before a second film member of said two film members.

3. The method of claim 2, further comprising:

starting said adherence of said second film member before an end of said adherence of said first film member.

4. The method of claim 1, wherein each of said rails has a thickness approximately equal to a combined thickness of said two film members.

5. The method of claim 1, wherein said two film members are separated along a line perpendicular on said edges of said rails, by a distance greater than a longitudinal length of one of said two film members.

6. The method of claim 1, wherein said leading edges of said two film members are positioned such that one of said two film members starts to adhere to said unfinished charge roller while the other of said two film members adheres to said unfinished charge roller.

* * * * *